US012194741B2

(12) United States Patent
Nishihara et al.

(10) Patent No.: US 12,194,741 B2
(45) Date of Patent: Jan. 14, 2025

(54) LIQUID DISCHARGE APPARATUS

(71) Applicant: SEIKO EPSON CORPORATION, Tokyo (JP)

(72) Inventors: Yuichi Nishihara, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 169 days.

(21) Appl. No.: 18/173,104

(22) Filed: Feb. 23, 2023

(65) Prior Publication Data

US 2023/0271413 A1 Aug. 31, 2023

(30) Foreign Application Priority Data

Feb. 25, 2022 (JP) ................................ 2022-027689

(51) Int. Cl.
*B41J 2/045* (2006.01)

(52) U.S. Cl.
CPC .................................. *B41J 2/0451* (2013.01)

(58) Field of Classification Search
CPC .... B41J 2/0451; B41J 2/04541; B41J 2/0455; B41J 2/04581; B41J 2/04596; B41J 2/04598
See application file for complete search history.

(56) References Cited

U.S. PATENT DOCUMENTS

2016/0059549 A1* 3/2016 Kamiyanagi ........ B41J 2/04593 347/10
2016/0279932 A1* 9/2016 Kamiyanagi ........ B41J 2/04541
2019/0193394 A1 6/2019 Suzuki

FOREIGN PATENT DOCUMENTS

JP 2019-116057 A 7/2019

* cited by examiner

*Primary Examiner* — Scott A Richmond
(74) *Attorney, Agent, or Firm* — Global IP Counselors, LLP

(57) ABSTRACT

A liquid discharge apparatus includes: a first discharge section that has a first piezoelectric element and discharges liquid by driving the first piezoelectric element with a driving signal; a driving signal generation section that generates the driving signal; a first selection section that performs a selection operation of selecting whether or not to apply each voltage of a plurality of driving waveforms included in the driving signal to the first piezoelectric element, based on a print data signal; a residual vibration detection section that detects residual vibration of the first discharge section after a voltage of a first driving waveform among the plurality of driving waveforms is applied to the first piezoelectric element; and a control section that generates the print data signal, in which the control section stops the driving signal generation section when causing the residual vibration detection section to detect the residual vibration.

9 Claims, 17 Drawing Sheets

| (SIH, SIM, SIL) | Sa | | Sb | | | Sc | | |
|---|---|---|---|---|---|---|---|---|
| | T1 | T2 | TS1 | TS2 | TS3 | TS1 | TS2 | TS3 |
| (1, 1, 0) [LARGE DOT] | H | H | L | L | L | L | L | L |
| (1, 0, 0) [MEDIUM DOT] | H | L | L | L | L | L | L | L |
| (0, 1, 0) [SMALL DOT] | L | H | L | L | L | L | L | L |
| (0, 0, 0) [NON-RECORDING] | L | L | L | L | L | L | L | L |
| (1, 1, 1) [INSPECTION] | L | L | H | L | H | L | H | L |

FIG. 14

| | | |
|---|---|---|
| Ap=1 | Tp < Tth2 | RS = 2 [ABNORMAL DISCHARGE (BUBBLES)] |
| | Tth2 ≤ Tp ≤ Tth3 | RS = 1 [NORMAL] |
| | Tth3 < Tp ≤ Tth4 | RS = 3 [ABNORMAL DISCHARGE (FOREIGN MATTER)] |
| | Tth4 < Tp | RS = 4 [ABNORMAL DISCHARGE (THICKENING)] |
| Ap=0 | – | RS = 5 [ABNORMAL DISCHARGE] |

LIQUID DISCHARGE APPARATUS

The present application is based on, and claims priority from JP Application Serial Number 2022-027689, filed Feb. 25, 2022, the disclosure of which is hereby incorporated by reference herein in its entirety.

BACKGROUND

1. Technical Field

The present disclosure relates to a liquid discharge apparatus.

2. Related Art

As a liquid discharge apparatus, such as an ink jet printer for discharging ink to print an image or a document, a liquid discharge apparatus using a piezoelectric element such as a piezo element is known. Piezoelectric elements are provided corresponding to each of a plurality of discharge sections in an ink jet head, each of the piezoelectric elements is driven according to a driving signal, and accordingly, a predetermined amount of ink is discharged from nozzles of the discharge sections at a predetermined timing to form dots on a medium such as a paper sheet.

In such a liquid discharge apparatus, abnormal discharge may occur in which ink cannot be discharged normally from the discharge section due to thickening of the ink that filled the discharge section, bubbles entering the discharge section, or the like. When abnormal discharge occurs, dots scheduled to be formed on the medium are not formed accurately, and the image quality deteriorates. In the related art, there is known a technology of detecting residual vibration, which is vibration remaining in a discharge section after the discharge section is driven, and determining the ink discharge state of the discharge section based on the detection result. Since the degree of residual vibration differs depending on the viscosity of the ink, and the viscosity of the ink varies depending on the temperature, JP-A-2019-116057 discloses a liquid discharge apparatus capable of simplifying an inspection sequence by changing the inspection timing of the residual vibration according to the temperature to make the determination criteria of the discharge state the same.

However, since the signal generated by residual vibration is very small, there is a concern that noise generated in generation of a high-voltage driving signal affects the detection operation of the residual vibration, and the detection accuracy deteriorates.

SUMMARY

According to an aspect of the present disclosure, there is provided a liquid discharge apparatus including: a first discharge section that has a first piezoelectric element and discharges liquid by driving the first piezoelectric element with a driving signal; a driving signal generation section that generates the driving signal; a first selection section that performs a selection operation of selecting whether or not to apply each voltage of a plurality of driving waveforms included in the driving signal to the first piezoelectric element, based on a print data signal; a residual vibration detection section that detects residual vibration of the first discharge section after a voltage of a first driving waveform among the plurality of driving waveforms is applied to the first piezoelectric element; and a control section that generates the print data signal, in which the control section stops the driving signal generation section when causing the residual vibration detection section to detect the residual vibration.

BRIEF DESCRIPTION OF THE DRAWINGS

FIG. 14 is a diagram illustrating an example of a determination logic by a determination section.

DESCRIPTION OF EXEMPLARY EMBODIMENTS

Figure 1:
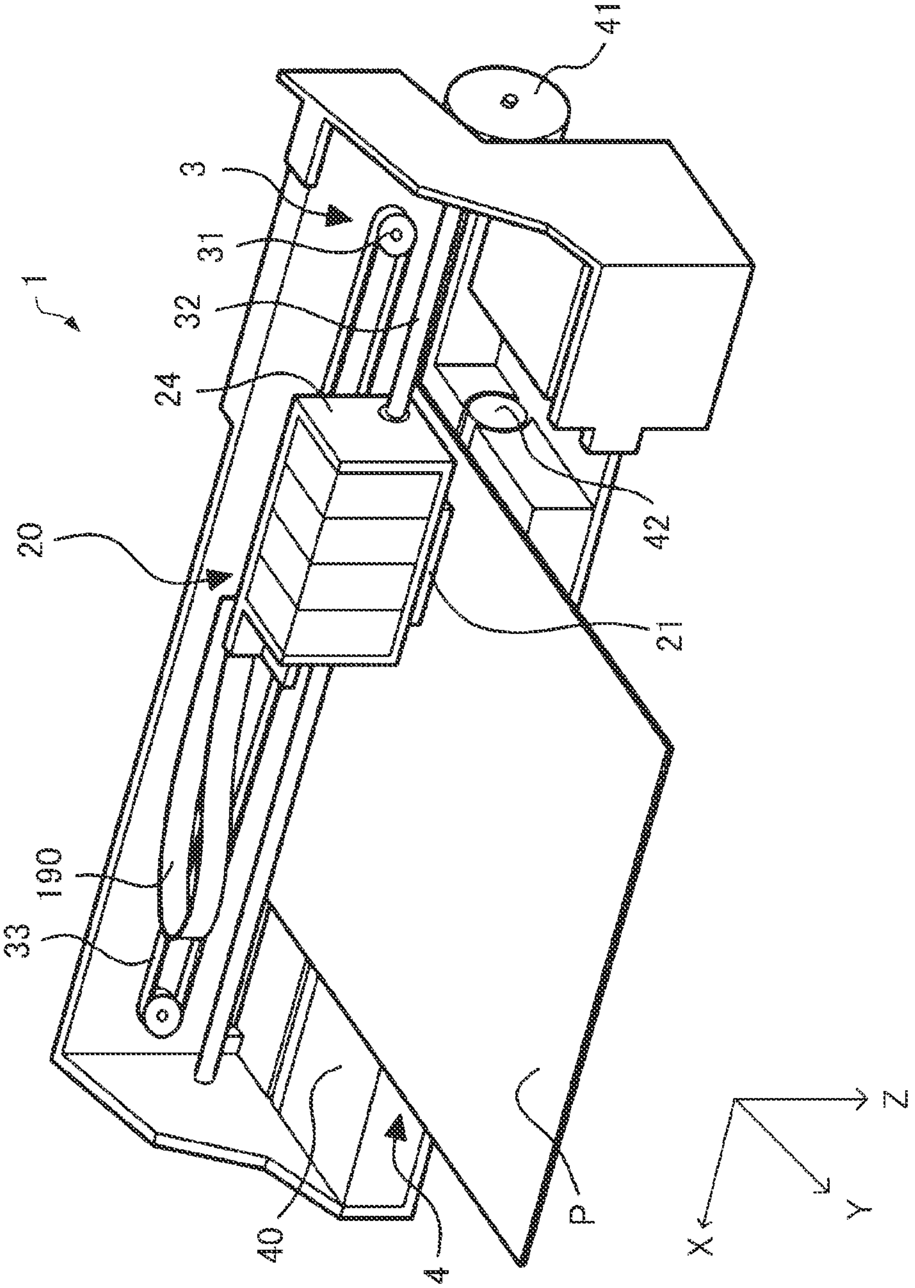
FIG. 1 is a view illustrating a schematic configuration of a liquid discharge apparatus.

Hereinafter, appropriate embodiments of the present disclosure will be described in detail with reference to the drawings. The drawing used is for convenience of description. In addition, the embodiments which will be described below do not inappropriately limit the contents of the present disclosure described in the claims. In addition, not all of the configurations which will be described below are necessarily essential components of the present disclosure.

1. First Embodiment

1-1. Overview of Liquid Discharge Apparatus

A printing apparatus which is an example of the liquid discharge apparatus according to the present embodiment is an ink jet printer that forms an ink dot group on a printing medium, such as a paper sheet, by discharging ink according to image data supplied from an external host computer, and accordingly, prints an image (including letters, figures, and the like) that corresponds to the image data.

FIG. 1 is a perspective view illustrating a schematic configuration of the inside of a liquid discharge apparatus 1 according to the present embodiment. As illustrated in FIG. 1, the liquid discharge apparatus 1 is a serial scan type liquid discharge apparatus, and includes a head unit 20 and a moving mechanism 3 that reciprocates the head unit 20 in a main scanning direction X. In addition, although not illustrated, a USB port and a power source port are disposed on a rear surface of the liquid discharge apparatus 1. In other words, the liquid discharge apparatus 1 is configured to be capable of being coupled to a computer or the like via the USB port. In addition, in the present embodiment, in the liquid discharge apparatus 1, a moving direction of a carriage 24 is defined as the main scanning direction X, a transport direction of a printing medium P is defined as a sub-scanning direction Y, and a vertical direction is defined as Z. In addition, the main scanning direction X, the sub-scanning direction Y, and the vertical direction Z are described in the drawings as three axes orthogonal to each other, but the arrangement relationship of each configuration is not necessarily limited to those orthogonal to each other.

The moving mechanism 3 includes a carriage motor 31 as a driving source of the head unit 20, a carriage guide shaft 32 of which both ends are fixed, and a timing belt 33 which extends substantially parallel to the carriage guide shaft 32 and is driven by the carriage motor 31.

The head unit 20 is configured to include a carriage 24 and a head 21 mounted on the carriage 24 so as to oppose the printing medium P. The carriage 24 is supported to be freely reciprocable by the carriage guide shaft 32 and fixed to a part of the timing belt 33. Therefore, by causing the timing belt 33 to travel in the forward and reverse directions by the carriage motor 31, the head unit 20 is guided by the carriage guide shaft 32 and reciprocates. The head 21 is for discharging ink droplets from a large number of nozzles, and is configured to be supplied with various control signals and the like via a cable 190. The cable 190 may be, for example, a flexible flat cable.

Figure 2:
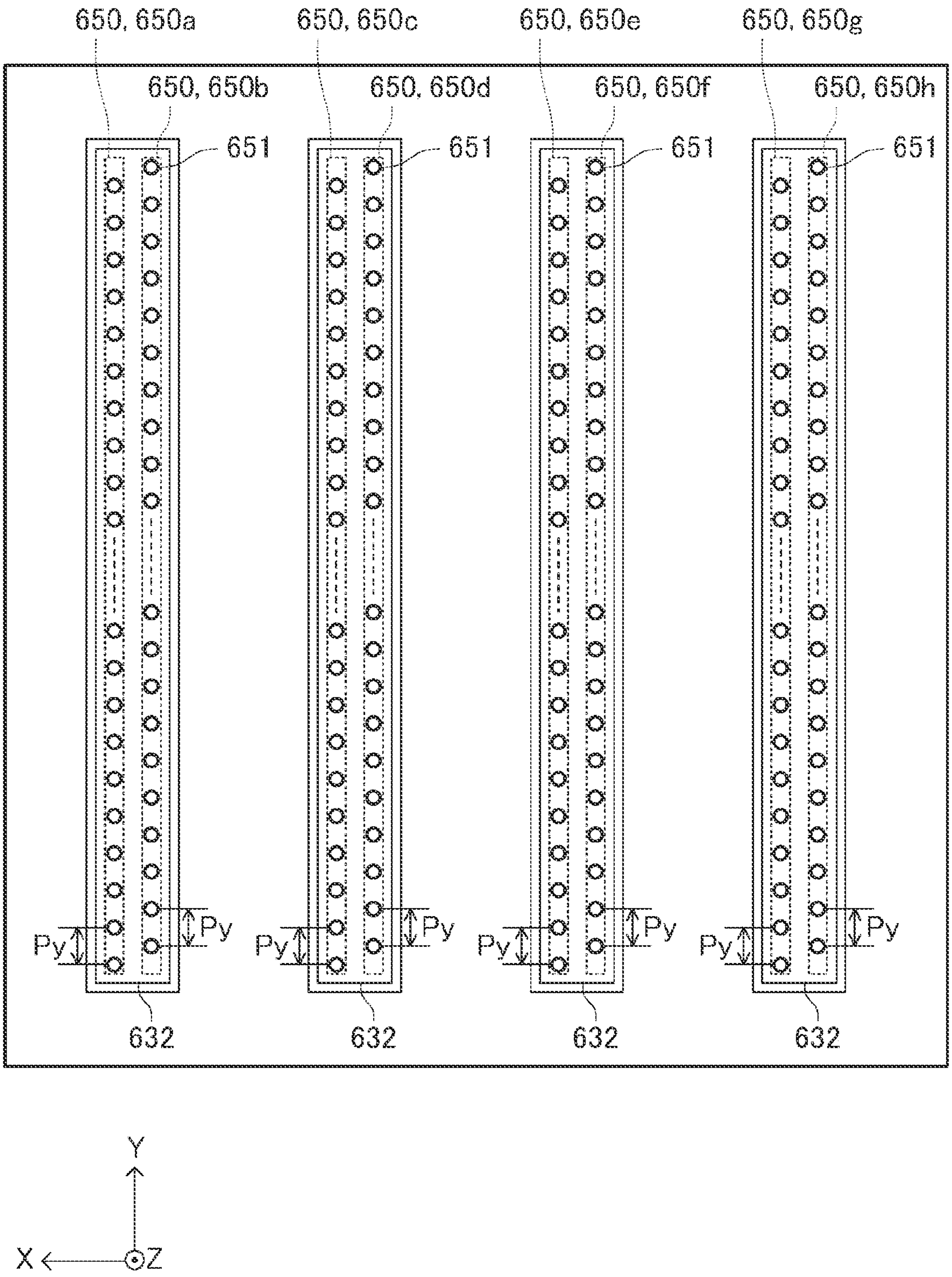
FIG. 2 is a view illustrating a lower surface of a head.

FIG. 2 is a view illustrating an ink discharge surface which is a lower surface of the head 21. As illustrated in FIG. 2, on the ink discharge surface of the head 21, four nozzle plates 632 respectively having two nozzle arrays 650 in which a large number of nozzles 651 are arranged at a predetermined pitch Py along the sub-scanning direction Y are provided to be arranged along the main scanning direction X. Between the two nozzle arrays 650 provided in each of the nozzle plates 632, each of the nozzles 651 is shifted by half of the pitch Py in the sub-scanning direction Y. In this manner, in the present embodiment, eight nozzle arrays 650, which are a first nozzle array 650*a* to an eighth nozzle array 650*h*, are provided on the ink discharge surface of the head 21.

Further, as illustrated in FIG. 1, the liquid discharge apparatus 1 includes a transport mechanism 4 that transports the printing medium P in the sub-scanning direction Y on a platen 40. The transport mechanism 4 includes a transport motor 41 which is a driving source, and a transport roller 42 which is rotated by the transport motor 41 and transports the printing medium P along the sub-scanning direction Y.

In the present embodiment, the carriage 24 stores four ink cartridges 22, and the ink that filled each ink cartridge 22 is supplied to the head 21. For example, the four ink cartridges 22 are filled with four color inks of cyan, magenta, yellow, and black, respectively. Each of the ink cartridges 22 may be provided in an ink tank attached to the main body side instead of being mounted on the carriage 24, and the ink that filled each of the ink cartridges 22 may be supplied to the head 21 via an ink tube.

An image is formed on the front surface of the printing medium P by discharging ink droplets in the vertical direction Z toward the printing medium P from the head 21 at the timing when the printing medium P is transported by the transport mechanism 4.

1-2. Electric Configuration of Liquid Discharge Apparatus

Figure 3A:
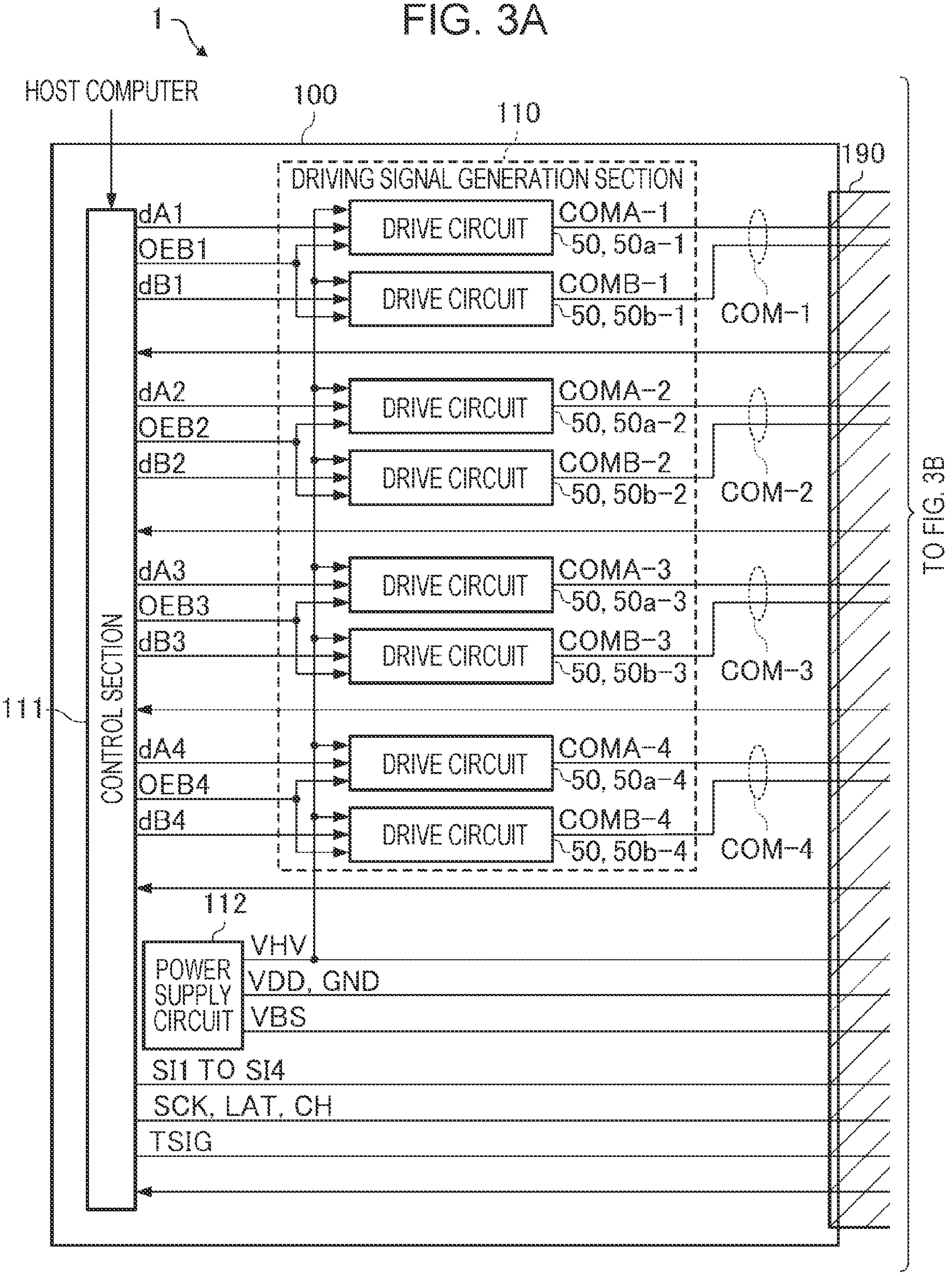
FIGS. 3A and 3B are block diagrams illustrating an electric configuration of the liquid discharge apparatus.
Figure 3B:
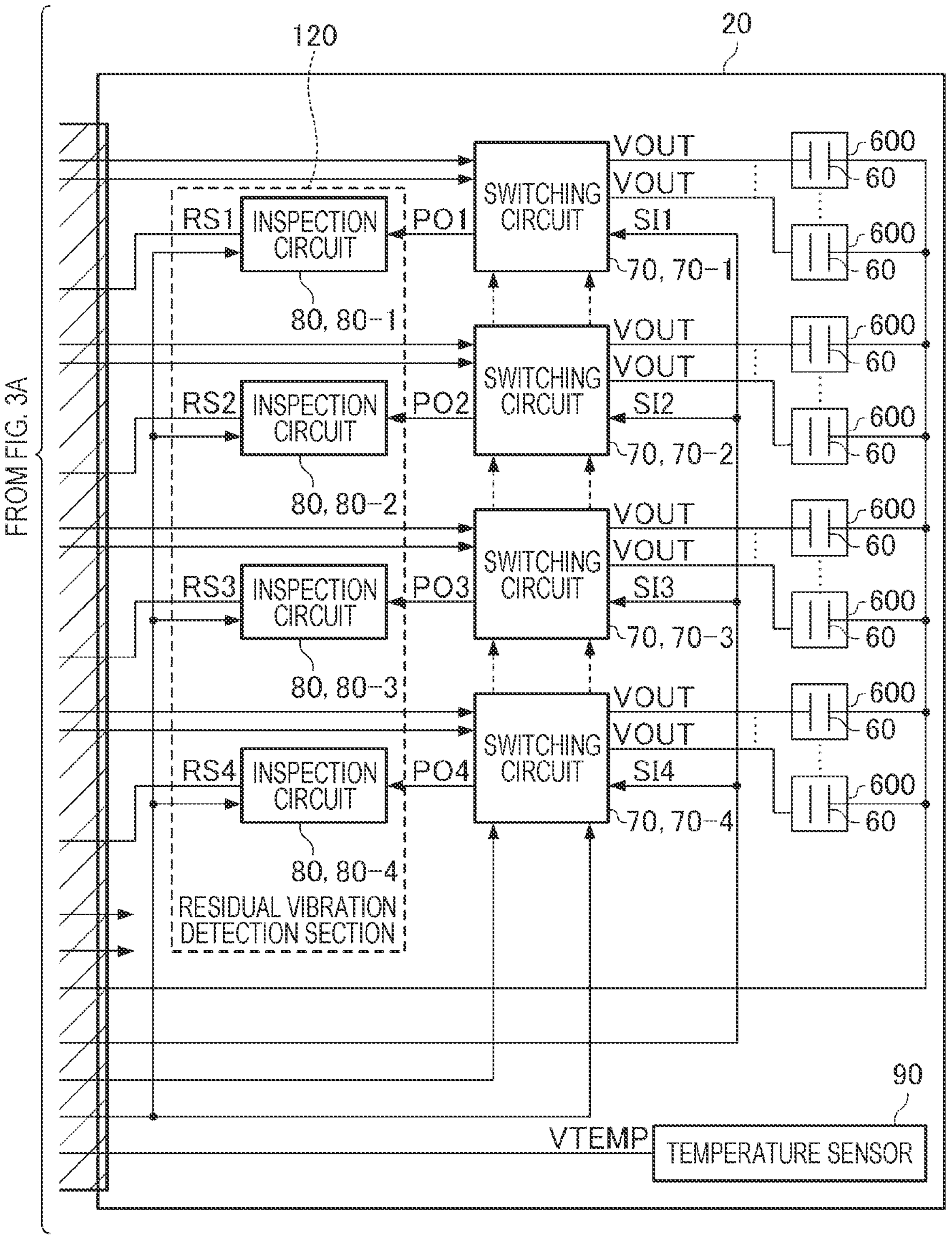

FIGS. 3A and 3B are block diagrams illustrating an electric configuration of the liquid discharge apparatus 1 according to the present embodiment. As illustrated in FIGS. 3A and 3B, the liquid discharge apparatus 1 includes a control substrate 100 and the head unit 20. The control substrate 100 is fixed at a predetermined location inside the main body of the liquid discharge apparatus 1 and coupled to the head unit 20 by the cable 190.

The control substrate 100 is provided with a control section 111, a power supply circuit 112, and eight drive circuits 50, which are drive circuits 50*a*-1 to 50*a*-4 and 50*b*-1 to 50*b*-4.

The control section 111 is realized by a processor, such as a microcontroller, and generates various types of data and signals based on various signals, such as image data supplied from the host computer.

Specifically, based on various signals from the host computer, respectively, the control section 111 generates driving data dA1 to dA4 and dB1 to dB4, which are digital data that serve as an original of driving signals COMA-1 to COMA-4 and COMB-1 to COMB-4 for driving each discharge section 600 included in the head 21. The driving data dA1 to dA4 are supplied each of the drive circuits 50*a*-1 to 50*a*-4, and the driving data dB1 to dB4 are supplied to each of the drive circuits 50*b*-1 to 50*b*-4. The driving data dA1 to dA4 are digital data that define the waveforms of the driving signals COMA-1 to COMA-4, respectively, and the driving data dB1 to dB4 are digital data that define the waveforms of the driving signals COMB-1 to COMB-4, respectively.

The control section 111 also generates output control signals OEB1 to OEB4. The output control signal OEB1 is a signal for controlling whether or not to generate and output the driving signals COMA-1 and COMB-1, and is supplied to the drive circuits 50*a*-1 and 50*b*-1. The output control signal OEB2 is a signal for controlling whether or not to generate and output the driving signals COMA-2 and COMB-2, and is supplied to the drive circuits 50*a*-2 and 50*b*-2. The output control signal OEB3 is a signal for controlling whether or not to generate and output the driving signals COMA-3 and COMB-3, and is supplied to the drive circuits 50*a*-3 and 50*b*-3. The output control signal OEB4 is a signal for controlling whether or not to generate and output the driving signals COMA-4 and COMB-4, and is supplied to the drive circuits 50*a*-4 and 50*b*-4.

In addition, the control section 111 generates four print data signals SI1 to SI4, a latch signal LAT, a change signal CH, and a clock signal SCK as the plural types of control signals for controlling the discharge of liquid from each of the discharge sections 600 based on various signals from the host computer. The control section 111 also generates an inspection control signal TSIG that instructs the start and end of detection of residual vibration, which is vibration remaining in the discharge section 600 after the discharge section 600 is driven. The print data signals SI1 to SI4, the latch signal LAT, the change signal CH, the clock signal SCK, and the inspection control signal TSIG are transferred from the control section 111 to the head unit 20 via the cable 190.

In addition to the above-described processing, the control section 111 performs processing of grasping a scanning position of the head unit 20 and driving a carriage motor 31 based on the scanning position of the head unit 20. Accordingly, the movement of the head unit 20 in the main scanning direction X is controlled. Further, the control section 111 performs processing of driving the transport motor 41. Accordingly, the movement of the printing medium P in the sub-scanning direction Y is controlled.

Furthermore, the control section 111 causes the maintenance mechanism (not illustrated) to execute cleaning processing or wiping processing, which is maintenance processing for correctly recovering a discharge state of the ink of the head 21.

The power supply circuit 112 generates a constant high power supply voltage VHV, a constant low power supply voltage VDD, a constant offset voltage VBS, and a ground voltage GND. As an example, the high power supply voltage VHV is 42 V, the low power supply voltage VDD is 3.3 V, the offset voltage VBS is 6 V, and the ground voltage GND is 0 V. The high power supply voltage VHV, the low power supply voltage VDD, the offset voltage VBS, and the ground voltage GND are transferred from the power supply circuit 112 to the head unit 20 by the cable 190. In addition, the high power supply voltage VHV, the low power supply voltage VDD, and the ground voltage GND are supplied to the drive circuits 50*a*-1 to 50*a*-4 and 50*b*-1 to 50*b*-4, respectively.

The drive circuits 50*a*-1 to 50*a*-4 and 50*b*-1 to 50*b*-4 generate the driving signals COMA-1 to COMA-4 and COMB-1 to COMB-4 based on each of the driving data dA1 to dA4 and dB1 to dB4. For example, the drive circuits 50*a*-1 to 50*a*-4 and 50*b*-1 to 50*b*-4 digital-to-analog convert the driving data dA1 to dA4 and dB1 to dB4, respectively, and then class-D-amplify the converted data to generate the driving signals COMA-1 to COMA-4 and COMB-1 to COMB-4. The driving data dA1 to dA4 and dB1 to dB4 are data that define the waveforms of the driving signals COMA-1 to COMA-4 and COMB-1 to COMB-4, respectively.

The drive circuits 50*a*-1 and 50*b*-1 perform an operation of generating and outputting the driving signals COMA-1 and COMB-1 respectively when the output control signal OEB1 is at a low level, and when the output control signal OEB1 is at a high level, output becomes high impedance. Similarly, the drive circuits 50*a*-2 and 50*b*-2 perform an operation of generating and outputting the driving signals COMA-2 and COMB-2 respectively when the output control signal OEB1 is at a low level, and when the output control signal OEB1 is at a high level, output becomes high impedance. Similarly, the drive circuits 50*a*-3 and 50*b*-3 perform an operation of generating and outputting the driving signals COMA-3 and COMB-3 respectively when the output control signal OEB1 is at a low level, and when the output control signal OEB1 is at a high level, output becomes high impedance. Similarly, the drive circuits 50*a*-4 and 50*b*-4 perform an operation of generating and outputting the driving signals COMA-4 and COMB-4 respectively when the output control signal OEB1 is at a low level, and when the output control signal OEB1 is at a high level, output becomes high impedance. When the outputs of the drive circuits 50*a*-1 to 50*a*-4 and 50*b*-1 to 50*b*-4 are high impedance, the driving signals COMA-1 to COMA-4 and COMB-1 to COMB-4 are the previous voltages held by the capacitive properties of each of the piezoelectric elements 60.

In addition, the drive circuits 50*a*-1 to 50*a*-4 and 50*b*-1 to 50*b*-4 may differ only in the input driving data, the output control signal, and the driving signal to be output, and may have the same circuit configuration, and the details thereof will be described later.

The driving signals COMA-1 to COMA-4 and COMB-1 to COMB-4 are transferred from the control substrate 100 to the head unit 20 by the cable 190.

The head unit 20 is provided with four switching circuits 70, which are switching circuits 70-1 to 70-4, four inspection circuits 80, which are inspection circuits 80-1 to 80-4, and a temperature sensor 90.

Each of the driving signals COMA-1 to COMA-4, each of the driving signals COMB-1 to COMB-4, and each of the print data signals SI1 to SI4 are input to the switching circuits 70-1 to 70-4. In addition, the clock signal SCK, the latch signal LAT, the change signal CH, and the inspection control signal TSIG are commonly input to the switching circuits 70-1 to 70-4. The switching circuits 70-1 to 70-4 are operated with the supply of the high power supply voltage VHV, the low power supply voltage VDD, and the ground voltage GND, and output the driving signals VOUT to each of the plurality of discharge sections 600 of the head 21. Specifically, the switching circuit 70-1 selects any of the driving signal COMA-1 and the driving signal COMB-1 to output the selected signal as the driving signal VOUT, and sets the output as high impedance without selecting any of the driving signal COMA-1 and the driving signal COMB-1, based on the clock signal SCK, the print data signal SI1, the latch signal LAT, the change signal CH, or the inspection control signal TSIG. Similarly, the switching circuits 70-2 to 70-4 select any of the driving signals COMA-2 to COMA-4 and the driving signals COMB-2 to COMB-4 to output the selected signal as the driving signal VOUT, and set the output as high impedance without selecting any of the driving signal COMA-1 and the driving signal COMB-1, based on the clock signal SCK, each of the print data signals SI2 to SI4, the latch signal LAT, the change signal CH, and the inspection control signal TSIG.

The driving signal VOUT output from the switching circuit 70-1 is applied to one end of the piezoelectric element 60 of each discharge section 600 provided corresponding to the first nozzle array 650*a* and the second nozzle array 650*b*. In addition, the driving signal VOUT output from the switching circuit 70-2 is applied to one end of the piezoelectric element 60 of each of the discharge sections 600 provided corresponding to the third nozzle array 650*c* and the fourth nozzle array 650*d*. In addition, the driving signal VOUT output from the switching circuit 70-3 is applied to one end of the piezoelectric element 60 of each of the discharge sections 600 provided corresponding to the fifth nozzle array 650*e* and the sixth nozzle array 650*f*. In addition, the driving signal VOUT output from the switching circuit 70-4 is applied to one end of the piezoelectric element 60 of each of the discharge sections 600 provided corresponding to the seventh nozzle array 650*g* and the eighth nozzle array 650*h*. The offset voltage VBS is commonly applied to the other end of each piezoelectric element 60. The piezoelectric element 60 is displaced according to the potential difference between the driving signal VOUT and the offset voltage VBS, and the nozzle 651 discharges an amount of ink corresponding to the displacement. Alternatively, the piezoelectric element 60 is displaced according to the potential difference between the driving signal VOUT and the offset voltage VBS, and ink is not discharged from the nozzle 651, causing residual vibration in the discharge section 600.

Further, based on the print data signal SI1 and the inspection control signal TSIG, the switching circuit 70-1 switches whether to electrically couple the inspection circuit 80-1 and one end of the piezoelectric element 60 of each discharge section 600 provided corresponding to the first nozzle array 650*a* or the second nozzle array 650*b*. Similarly, based on the print data signal SI2 and the inspection control signal TSIG, the switching circuit 70-2 switches whether to electrically couple the inspection circuit 80-2 and one end of the piezoelectric element 60 of each discharge section 600 provided corresponding to the third nozzle array 650*c* or the fourth nozzle array 650*d*. Similarly, based on the print data signal SI3 and the inspection control signal TSIG, the switching circuit 70-3 switches whether to electrically couple the inspection circuit 80-3 and one end of the piezoelectric element 60 of each discharge section 600 provided corresponding to the fifth nozzle array 650*e* or the sixth nozzle array 650*f*. Similarly, based on the print data signal SI4 and the inspection control signal TSIG, the switching circuit 70-4 switches whether to electrically couple the inspection circuit 80-4 and one end of the piezoelectric element 60 of each discharge section 600 provided corresponding to the seventh nozzle array 650*g* or the eighth nozzle array 650*h*.

Specifically, the switching circuits 70-1 to 70-4 select the discharge section 600, of which the discharge state is an inspection target, based on each of the print data signals SI1 to SI4. Hereinafter, the discharge section 600, of which the discharge state is an inspection target, will be referred to as "inspection target discharge section 600", and the discharge section 600 of which the discharge state is not an inspection target will be referred to as "non-inspection target discharge section 600". Further, based on the inspection control signal TSIG, the switching circuits 70-1 to 70-4 electrically couple each of the inspection circuits 80-1 to 80-4 and one end of the piezoelectric element 60 of the inspection target discharge section 600, and electrically disconnects each of the inspection circuits 80-1 to 80-4 from one end of the piezoelectric element 60 of the non-inspection target discharge section 600. Then, in a state where one end of the piezoelectric element 60 of each of the four inspection target discharge sections 600 is electrically coupled to each of the inspection circuits 80-1 to 80-4, inspection target signals PO1 to PO4 which appear at each one end of the piezoelectric elements 60 of each of the four inspection target discharge sections 600 are input to each of the inspection circuits 80-1 to 80-4.

In addition, the circuit configurations of the switching circuits 70-1 to 70-4 may be the same as each other, and the details thereof will be described later.

The inspection circuits 80-1 to 80-4 receive the inspection control signal TSIG and the inspection target signals PO1 to PO4, respectively, and are operated with the supply of the low power supply voltage VDD and the ground voltage GND. The inspection circuits 80-1 to 80-4 detect the residual vibration of the discharge section 600 after applying the driving signal VOUT to the piezoelectric element 60 of the inspection target discharge section 600 based on each of the inspection target signals PO1 to PO4 in synchronization with the inspection control signal TSIG. Furthermore, the inspection circuits 80-1 to 80-4 determine the ink discharge state of the inspection target discharge section 600 based on the detection result of the residual vibration, and output determination result signals RS1 to RS4 representing the determination results, respectively. The determination result signals RS1 to RS4 are transferred from the head unit 20 to the control section 111 via the cable 190.

In addition, the circuit configurations of the inspection circuits 80-1 to 80-4 may be the same as each other, and the details thereof will be described later.

The control section 111 performs processing that corresponds to the determination result signals RS1 to RS4. For example, when at least one of the determination result signals RS1 to RS4 indicates that abnormal discharge occurred in the discharge section 600, the control section 111 may display an error message on a display (not illustrated) of the liquid discharge apparatus 1. Further, for example, the control section 111 may generate a control signal for causing a maintenance mechanism (not illustrated) to execute maintenance processing, or instead of the discharge section 600 having abnormal discharge, the discharge section 600 having no abnormal discharge may generate the print data signals SI1 to SI4 for performing complementary recording processing of complementing printing on the printing medium P.

The temperature sensor 90 is operated with the supply of the low power supply voltage VDD and the ground voltage GND, detects the temperature of the head 21, and outputs a temperature signal VTEMP indicating the temperature of the head 21. For example, the temperature sensor 90 may be provided inside the head 21 or may be provided on the outer surface of the head 21. The temperature signal VTEMP is transferred from the head unit 20 to the control section 111 via the cable 190.

The control section 111 generates the driving data dA1 to dA4 and dB1 to dB4 for correcting the driving signals COMA-1 to COMA-4 and COMB-1 to COMB-4 based on the temperature signal VTEMP. In the present embodiment, the driving signal VOUT for discharging ink from each discharge section 600 in order to print an image based on the image data on the printing medium P is generated based on the driving signals COMA-1 to COMA-4. Then, the control section 111 changes the driving data dA1 to dA4 according to the value (voltage level or digital value) of the temperature signal VTEMP such that the amount of ink discharged from each of the discharge sections 600 is constant regardless of the temperature. Specifically, as the temperature of the discharge section 600 decreases, the viscosity of the ink increases and it becomes more difficult for the ink to be discharged from the nozzles 651. Therefore, the control section 111 generates the driving data dA1 to dA4 such that the amplitude of the driving signals COMA-1 to COMA-4 increases as the temperature of the discharge section 600, that is, the temperature of the head 21 indicated by the temperature signal VTEMP decreases.

In the present embodiment, the drive circuits 50*a*-1 to 50*a*-4 and 50*b*-1 to 50*b*-4 includes a driving signal generation section 110 that generates the driving signal COM-1 composed of the driving signals COMA-1 and COMB-1, the driving signal COM-2 composed of the driving signals COMA-2 and COMB-2, the driving signal COM-3 composed of the driving signals COMA-3 and COMB-3, and the driving signal COM-4 composed of the driving signals COMA-4 and COMB-4. Moreover, the inspection circuits 80-1 to 80-4 constitute a residual vibration detection section 120 that detects residual vibration of the discharge section 600 after the driving signal COMB is applied to the piezoelectric element 60.

1-3. Configuration of Discharge Section

Figure 4:
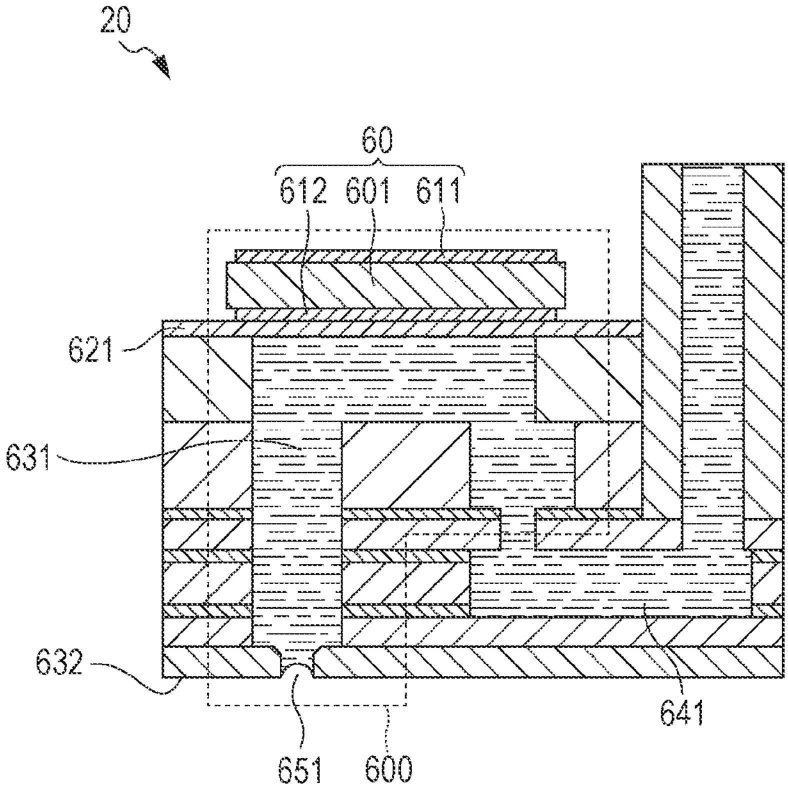
FIG. 4 is a view illustrating a schematic configuration that corresponds to one discharge section.

FIG. 4 is a view illustrating a schematic configuration that corresponds to one discharge section 600 of the head 21. As illustrated in FIG. 4, the head 21 includes the discharge section 600 and a reservoir 641.

The reservoir 641 is provided for each color of ink, and the ink is introduced into the reservoir 641 from a supply port 661. Ink is supplied from the ink cartridge 22 to the supply port 661.

The discharge section 600 includes the piezoelectric element 60, a vibrating plate 621, a cavity 631, and the nozzle 651. Among the members, the vibrating plate 621 functions as a diaphragm that is displaced by the piezoelectric element 60 provided on the upper surface in the drawing, and enlarges and reduces the internal volume of the cavity 631 filled with ink. The nozzle 651 is an opening portion which is provided on the nozzle plate 632 and communicates with the cavity 631. The inside of the cavity 631 is filled with the ink which is liquid, and the internal volume changes due to the displacement of the piezoelectric element 60. The nozzle 651 communicates with the cavity 631 and discharges the ink in the cavity 631 as liquid droplets according to the change in internal volume of the cavity 631. In this manner, the discharge section 600 discharges ink from the nozzle 651 by driving the piezoelectric element 60.

The piezoelectric element 60 illustrated in FIG. 4 has a structure in which a piezoelectric body 601 is sandwiched between one pair of electrodes 611 and 612. In the piezoelectric body 601 having the structure, according to the voltage applied by the electrodes 611 and 612, the center part in FIG. 4 together with the electrodes 611 and 612 and the vibrating plate 621 bends in the up-down direction with respect to both end parts. Specifically, the driving signal VOUT is applied to the electrode 611 which is one end of the piezoelectric element 60, and the offset voltage VBS is applied to the electrode 612 which is the other end of the piezoelectric element 60. In addition, while the piezoelectric element 60 bends in the upward direction when the voltage of the driving signal VOUT decreases, the piezoelectric element 60 bends in the downward direction when the voltage of the driving signal VOUT increases. In the configuration, since the internal volume of the cavity 631 expands when the piezoelectric element 60 bends in the upward direction, the ink is drawn out of the reservoir 641. Meanwhile, when the piezoelectric element 60 bends in the downward direction, the internal volume of the cavity 631 is reduced, and thus, the ink is discharged from the nozzle 651 as much as the reduction of the internal volume.

In addition, the piezoelectric element 60 is not limited to the illustrated structure and may be any type as long as the piezoelectric element 60 can be deformed and the liquid, such as ink, can be discharged. Further, the piezoelectric element 60 is not limited to bending vibration, and may employ a configuration in which so-called longitudinal vibration is used.

Figure 7:
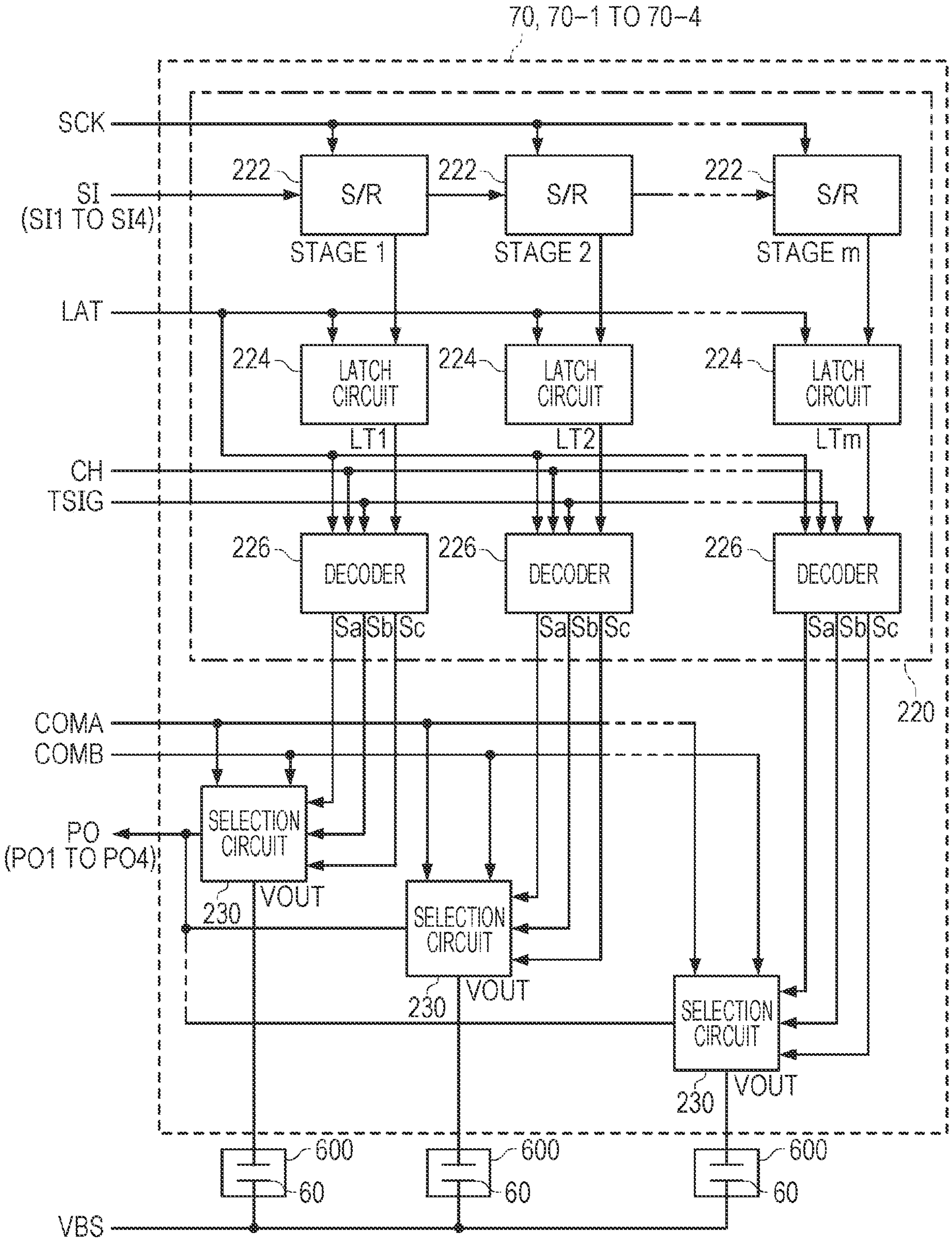
FIG. 7 is a view illustrating a configuration of a switching circuit.

In addition, the piezoelectric element 60 is provided corresponding to the cavity 631 and the nozzle 651 in the head 21, and is also provided corresponding to a selection circuit 230 illustrated in FIG. 7 (which will be described later). Therefore, a set of the piezoelectric element 60, the cavity 631, the nozzle 651, and the selection circuit 230 is provided for each of the nozzles 651.

1-4. Configuration of Driving Signal

In the present embodiment, the driving signal COMA-1 is prepared to express one dot with four gradations of "large dot", "medium dot", "small dot", and "non-recording" by liquid droplets discharged from each of the nozzles 651 included in the first nozzle array 650*a* or the second nozzle array 650*b*, and one cycle of the driving signal COMA-1 has a first half pattern and a second half pattern. The driving signal COMA-1 is selected according to the gradation to be expressed in the first half and the second half of one cycle and are supplied to the piezoelectric elements 60 provided corresponding to each of the nozzles 651. Furthermore, in the present embodiment, in order to perform the "inspection" on the inspection target discharge section 600 among the discharge sections 600 provided corresponding to the first nozzle array 650*a* or the second nozzle array 650*b*, the driving signal COMB-1 is also prepared separately from the driving signal COMA-1. Further, in the present embodiment, the driving signals COMA-2 to COMA-4 are prepared for the same purpose as the driving signal COMA-1, and the driving signals COMB-2 to COMB-4 are prepared for the same purpose as the driving signal COMB-1.

Although the driving signals COMA-1 to COMA-4 have slightly different waveforms because the types of ink to be discharged are different, the basic configuration is the same. Similarly, the driving signals COMB-1 to COMB-4 have the same basic configuration even when the waveforms thereof are slightly different. Therefore, hereinafter, in the description, the driving signals COMA-1 to COMA-4 may be collectively referred to as the driving signal COMA, the driving signals COMB-1 to COMB-4 may be collectively referred to as the driving signal COMB, and the driving signal COM-1 consisting of the driving signal COMA-1 and COMB-1, the driving signal COM-2 consisting of the driving signals COMA-2 and COMB-2, the driving signal COM-3 consisting of the driving signals COMA-3 and COMB-3, and the driving signal COM-4 consisting of the driving signals COMA-4 and COMB-4 may be collectively referred to as the driving signal COM.

Figure 5:
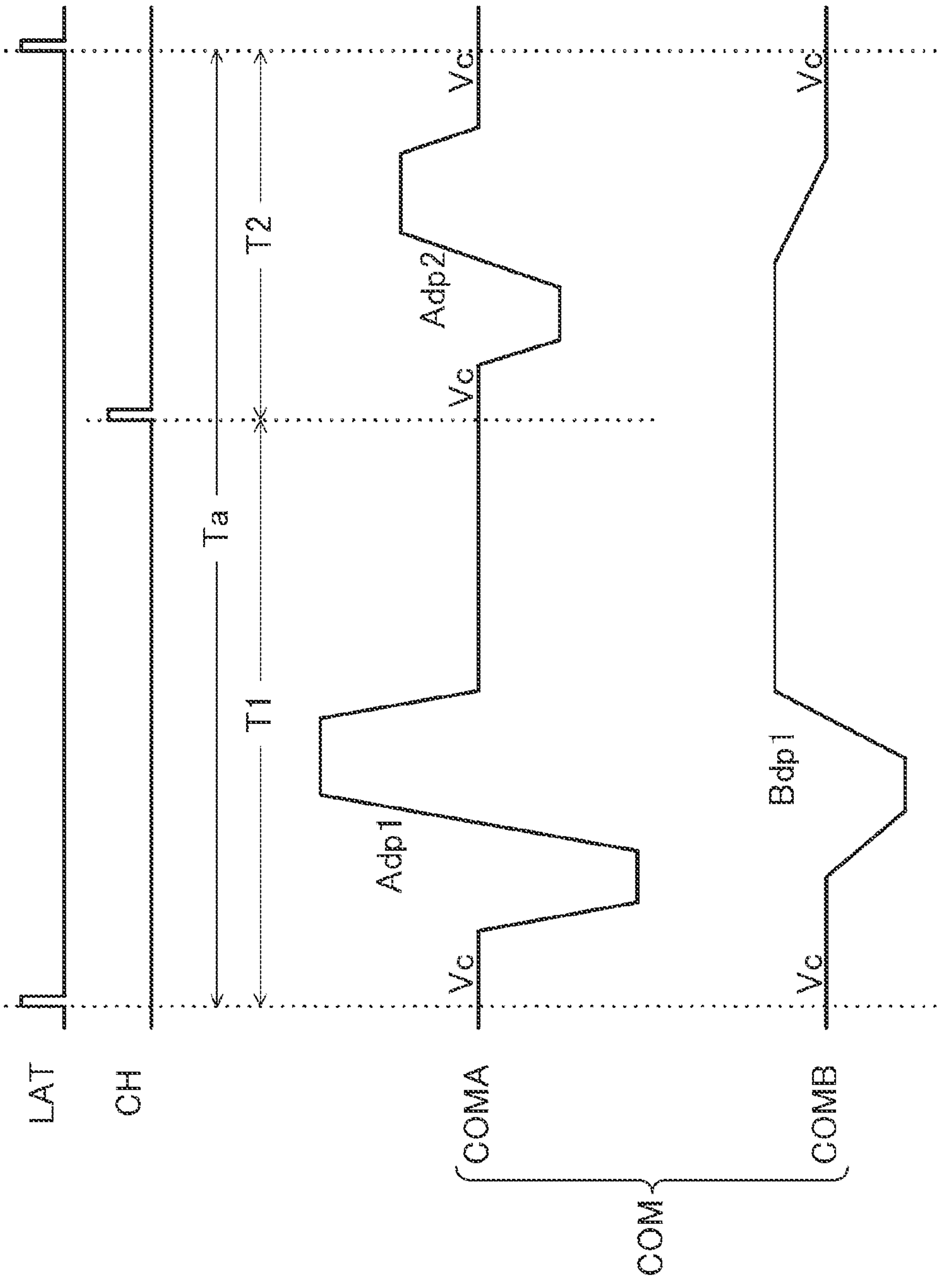
FIG. 5 is a view illustrating waveforms of driving signals.

FIG. 5 is a view illustrating waveforms of the driving signals COMA and COMB. As illustrated in FIG. 5, the driving signal COMA has waveforms in which a trapezoidal waveform Adp1 disposed in the period T1 from the rise of the pulse of the latch signal LAT to the rise of the pulse of the change signal CH, and a trapezoidal waveform Adp2 disposed in the period T2 from the rise of the pulse of the change signal CH to the rise of the next pulse of the latch signal LAT are continuous to each other. A new dot is formed on the printing medium P every cycle Ta, with a period including the period T1 and the period T2 as a cycle Ta.

In the present embodiment, the trapezoidal waveforms Adp1 and Adp2 are waveforms different from each other. Of these waveforms, the trapezoidal waveform Adp1 is a waveform that, when supplied to one end of the piezoelectric element 60, causes a predetermined amount, specifically a medium amount of ink, to be discharged respectively from the nozzles 651 corresponding to the piezoelectric elements 60. In addition, the trapezoidal waveform Adp2 is a waveform that, when supplied to one end of the piezoelectric element 60, causes an amount smaller than the predetermined amount, specifically a small amount of ink, to be discharged from the nozzle 651 corresponding to the piezoelectric element 60.

The driving signal COMB has a trapezoidal waveform Bdp1 arranged over the entire cycle Ta. The trapezoidal waveform Bdp1 is a waveform that, when supplied to one end of the piezoelectric element 60, drives the piezoelectric element 60 such that the ink droplets are not discharged from the nozzle 651.

In addition, both the voltage at the start timing of the trapezoidal waveforms Adp1, Adp2, and Bdp1 and the voltage at the end timing are common to a voltage Vc. In other words, the trapezoidal waveforms Adp1, Adp2, and Bdp1 respectively have a waveform that starts at the voltage Vc and ends at the voltage Vc. The control section 111 generates the driving data dA1 to dA4 and dB1 to dB4 such that, as the temperature of the discharge section 600, that is, the temperature of the head 21 indicated by the temperature signal VTEMP decreases, the voltage Vc increases.

Each of the discharge sections 600 discharges ink by driving the piezoelectric element 60 with the driving signal COM including the driving signals COMA and COMB. In the present embodiment, the driving signal VOUT including the driving waveform selected from the trapezoidal waveforms Adp1, Adp2, and Bdp1, which are a plurality of driving waveforms included in the driving signal COM, is applied to the piezoelectric element 60.

Figure 6:
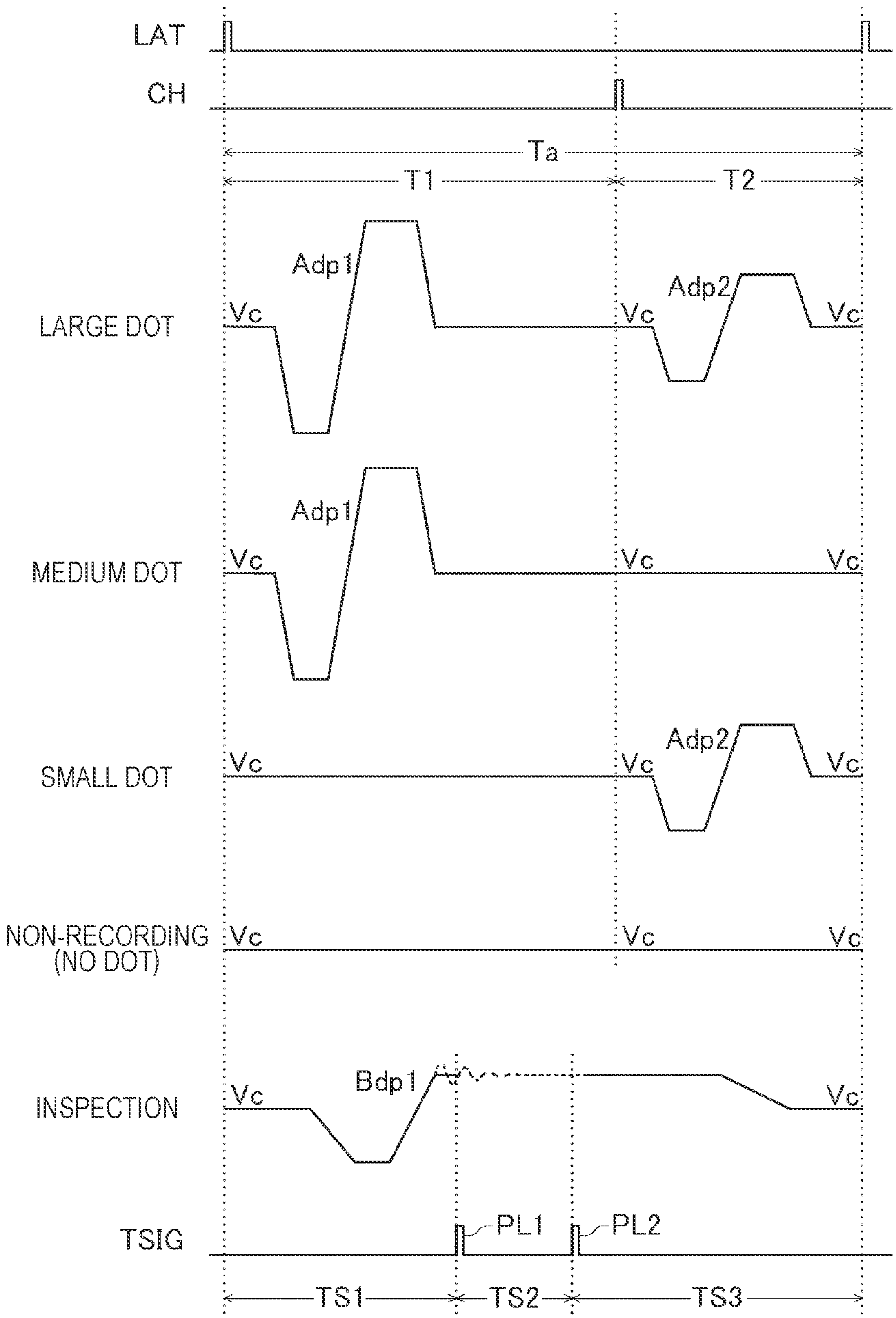
FIG. 6 is a view illustrating waveforms of a driving signal.

FIG. 6 is a view illustrating waveforms of the driving signals VOUT that correspond to "large dot", "medium dot", "small dot", "non-recording", and "inspection", respectively.

As illustrated in FIG. 6, the driving signal VOUT that corresponds to the "large dot" has a waveform in which the trapezoidal waveform Adp1 of the driving signal COMA in the period T1 and the trapezoidal waveform Adp2 of the driving signal COMA in the period T2 are continuous to each other. When the driving signal VOUT is supplied to one end of the piezoelectric element 60, in the cycle Ta, medium and small amounts of ink are discharged two times from the nozzle 651 that corresponds to the piezoelectric element 60. Therefore, the ink respectively land on the printing medium P and is integrated with each other, and a large dot is formed.

The driving signal VOUT that corresponds to the "medium dot" becomes the trapezoidal waveform Adp1 of the driving signal COMA in the period T1, and becomes the previous voltage Vc held by the capacitive properties of the piezoelectric element 60 because of the high impedance in the period T2. When the driving signal VOUT is supplied to one end of the piezoelectric element 60, in the cycle Ta, a medium amount of ink is discharged only in the period T1 from the nozzle 651 that corresponds to the piezoelectric element 60. Therefore, the ink lands on the printing medium P, and a medium dot is formed.

The driving signal VOUT that corresponds to the "small dot" becomes the previous voltage Vc held by the capacitive properties of the piezoelectric element 60 because of the high impedance in the period T1, and becomes the trapezoidal waveform Adp2 of the driving signal COMA in the period T2. When the driving signal VOUT is supplied to one end of the piezoelectric element 60, in the cycle Ta, a small amount of ink is discharged only in the period T2 from the nozzle 651 that corresponds to the piezoelectric element 60. Therefore, the ink lands on the printing medium P, and a small dot is formed.

The driving signal VOUT corresponding to "non-recording" becomes high impedance in the period T1 and the period T2, and thus becomes the previous voltage Vc held by the capacitive properties of the piezoelectric element 60. When the driving signal VOUT is supplied to one end of the piezoelectric element 60, in the cycle Ta, the ink is not discharged from the nozzle 651 that corresponds to the piezoelectric element 60. Therefore, the ink does not land on the printing medium P, and no dot is formed.

The driving signal VOUT corresponding to "inspection" becomes the trapezoidal waveform Bdp1 of the driving signal COMB in the period TS1 and the period TS3, and becomes a high impedance in the period TS2. Here, the periods TS1, TS2, and TS3 are defined by the inspection control signal TSIG. Specifically, the inspection control signal TSIG is a signal for instructing the inspection circuits 80-1 to 80-4 to start detecting the residual vibration for each of the discharge sections 600, and has a first pulse PL1 that defines the start timing of detection of residual vibration in the cycle Ta. In addition, the inspection control signal TSIG is also a signal for instructing the inspection circuits 80-1 to 80-4 to end the detection of residual vibration for each of the discharge sections 600, and has a second pulse PL2 that defines the end timing of the detection of residual vibration in the cycle Ta. The cycle Ta is divided into the period TS1 from the rise of the pulse of the latch signal LAT to the rise of the first pulse PL1, the period TS2 from the rise of the first pulse PL1 to the rise of the second pulse PL2, and the period TS3 from the rise of the second pulse PL2 to the rise of the next pulse of the latch signal LAT.

When the driving signal VOUT for inspection is supplied to one end of the piezoelectric element 60, in the discharge section 600 having the piezoelectric element 60, in the period TS1, the cavity 631 expands rapidly as the potential of the driving signal VOUT increases, and then, the cavity 631 rapidly contracts as the potential of the driving signal VOUT drops. After that, when the potential of the driving signal VOUT finishes rising and reaches a constant potential, the cavity 631 returns to the original volume thereof while repeating expansion and contraction. However, at this time, residual vibration that attenuates over time is generated in the cavity 631 and is applied to the piezoelectric element 60. The electromotive force of the piezoelectric element 60 changes according to this residual vibration, and a residual vibration waveform appears in the driving signal VOUT in the period TS2. Although the details will be described later, in the present embodiment, in the inspection circuits 80-1 to 80-4, the discharge state of the inspection target discharge section 600 is determined based on the residual vibration waveform appearing in the driving signal VOUT.

In the present embodiment, in each cycle Ta, one or both of the printing processing of supplying the driving signal VOUT for "large dot", "medium dot", "small dot" or "non-recording" to each of the discharge sections 600, and the inspection processing of determining the supply of the driving signal VOUT for "inspection" and the discharge state, can be executed. The liquid discharge apparatus 1 forms an image that corresponds to the image data on the printing medium P by repeatedly executing the printing processing over a plurality of continuous or intermittent cycles Ta.

For example, for each of the plurality of cycles Ta, with respect to any one of the discharge sections 600 to which the driving signal VOUT for "non-recording" is supplied in the printing processing, instead, the driving signal VOUT for "inspection" may be supplied. In the present embodiment, the liquid discharge apparatus 1 has four inspection circuits 80-1 to 80-4, such that, when an image corresponding to the image data is formed on the printing medium P over M cycles Ta, it is possible to perform the inspection processing for a maximum of M×4 discharge sections 600 in parallel with the printing processing.

Further, for example, the inspection processing may be performed during a period in which the printing processing is unnecessary, for example, a period from the end of printing one page to the start of printing the next page when printing a plurality of pages, or may be performed separately from the printing processing when the inspection mode is set.

In addition, the driving signals COMA and COMB illustrated in FIG. 5 are merely examples. Actually, various combinations of waveforms prepared in advance are used according to the moving speed of the head unit 20, the printing medium P, the structure of the discharge section 600, the viscosity of ink, or the like.

In addition, here, an example in which the piezoelectric element 60 bends in the upward direction as the voltage decreases is described, but, when the voltage supplied to the electrodes 611 and 612 is reversed, the piezoelectric element 60 bends in the downward direction as the voltage decreases. Therefore, in the configuration in which the piezoelectric element 60 bends in the downward direction as the voltage decreases, the driving signals COMA and COMB illustrated in FIG. 5 have inverted waveforms with respect to the voltage Vc.

1-5. Configuration of Switching Circuit

Next, the configuration of the switching circuit 70 will be described. FIG. 7 is a view illustrating the configuration of the switching circuit 70. Hereinafter, the print data signals SI1 to SI4 will be referred to as the print data signal SI, the driving signals COMA-1 to COMA-4 will be referred to as the driving signal COMA, the driving signals COMB-1 to COMB-4 will be referred to as the driving signal COMB, and the inspection target signal PO1 to PO4 will be described as the inspection target signal PO. As illustrated in FIG. 7, the switching circuit 70 includes a selection control section 220 and a plurality of selection circuits 230.

The selection control section 220 is supplied with the clock signal SCK, the print data signal SI, the latch signal LAT, the change signal CH, and the inspection control signal TSIG. In the selection control section 220, a set of a shift register 222, a latch circuit 224, and a decoder 226 is provided corresponding to each of the piezoelectric elements 60. In other words, the number of sets of the shift register 222, the latch circuit 224, and the decoder 226 included in one switching circuit 70 is the same as the total number m of the nozzles 651 included in the two nozzle arrays 650.

The print data signal SI is a signal of 3m bits in total including 3 bits of printing data (SIH, SIM, SIL) for selecting one of "large dot", "medium dot", "small dot", "non-recording", and "inspection" with respect to each of m discharge sections 600.

The print data signal SI is a signal synchronized with the clock signal SCK, and corresponding to the nozzle 651, for each piece of the print data (SIH, SIM, SIL) for 3 bits included in the print data signal SI, a configuration for temporarily holding the data is the shift register 222.

Specifically, the shift register 222 having the number of stages that corresponds to the piezoelectric element 60 is continuously coupled to each other, and the print data signal SI which is serially supplied is sequentially transferred to the subsequent stage according to the clock signal SCK.

In addition, in order to distinguish the shift register 222, the shift register 222 is denoted as stage 1, stage 2, . . . , and stage m in order from the upstream to which the print data signal SI is supplied.

Each of m latch circuits 224 latches the 3-bit print data (SIH, SIM, SIL) held by each of m shift registers 222 at the rise of the latch signal LAT.

Each of the m decoders 226 decodes the 3-bit print data (SIH, SIM, SIL) latched by each of the m latch circuits 224, outputs the selection signal Sa for each of the periods T1 and T2 defined by the latch signal LAT and the change signal CH, outputs the selection signals Sb and Sc for each of the periods TS1, TS2, and TS3 defined by the latch signal LAT and the inspection control signal TSIG, and defines the selection in the selection circuit 230.

Figures 8, 9:
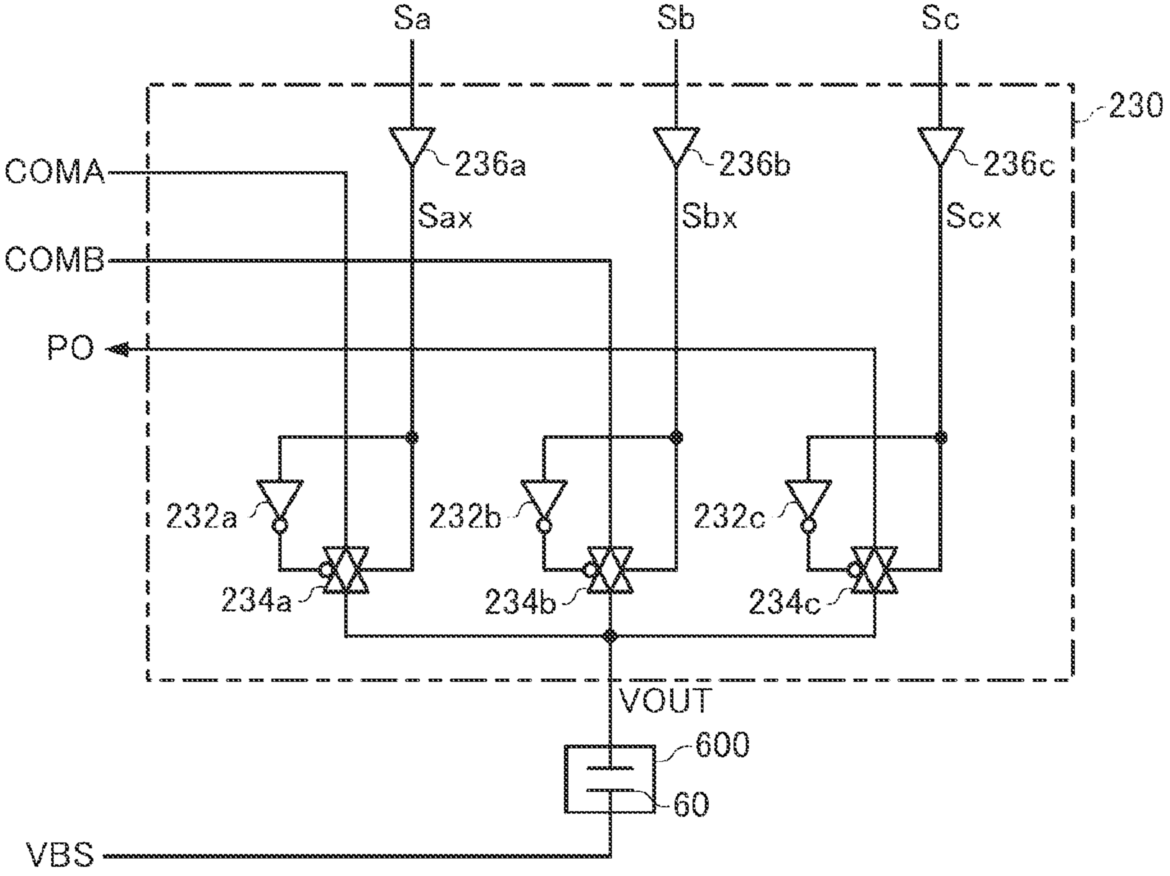
FIG. 8 is a view illustrating decoding contents in a decoder.
FIG. 9 is a view illustrating a configuration of a selection circuit.

FIG. 8 is a view illustrating the decoding contents in the decoder 226. As illustrated in FIG. 8, when the latched 3-bit print data (SIH, SIM, SIL) is (1, 1, 0) indicating "large dot", the decoder 226 outputs the logic level of the selection signal Sa as a high level in both periods T1 and T2, and outputs the logic level of the selection signals Sb and Sc as a low level in all of the periods TS1, TS2 and TS3.

Further, when the 3-bit print data (SIH, SIM, SIL) is (1, 0, 0) indicating "medium dot", the decoder 226 outputs the logic level of the selection signal Sa as a high level in the period T1 and as a low level in the period T2, and outputs the logic level of the selection signals Sb and Sc as a low level in all of the periods TS1, TS2, and TS3.

Further, when the 3-bit print data (SIH, SIM, SIL) is (0, 1, 0) indicating "small dot", the decoder 226 outputs the logic level of the selection signal Sa as a low level in the period T1 and as a high level in the period T2, and outputs the logic level of the selection signals Sb and Sc as a low level in all of the periods TS1, TS2, and TS3.

Further, when the 3-bit print data (SIH, SIM, SIL) is (0, 0, 0) indicating "non-recording", the decoder 226 outputs the logic level of the selection signal Sa as a low level in the periods T1 and T2, and outputs the logic level of the selection signals Sb and Sc as a low level in all of the periods TS1, TS2, and TS3.

Further, when the 3-bit print data (SIH, SIM, SIL) is (1, 1, 1) indicating "inspection", the decoder 226 outputs the logic level of the selection signal Sa as a low level in both the periods T1 and T2, outputs the logic level of the selection signal Sb as a high level in the periods TS1 and TS3 and as a low level in the period TS2, and outputs the logic level of the selection signal Sc as a low level in the periods TS1 and TS3 and as a high level in the period TS2.

The selection circuit 230 is provided corresponding to each of the piezoelectric elements 60. In other words, the number of selection circuits 230 of one switching circuit 70 is the same as the total number m of the nozzles 651 included in the two nozzle arrays 650.

FIG. 9 is a view illustrating a configuration of the selection circuit 230 that corresponds to one piezoelectric element 60.

As illustrated in FIG. 9, the selection circuit 230 has logic inversion circuits 232*a*, 232*b*, and 232*c*, transfer gates 234*a*, 234*b*, and 234*c*, and level shift circuits 236*a*, 236*b*, and 236*c*.

The selection signal Sa from the decoder 226 is a signal of low logic amplitude, and is level-shifted to a selection signal Sax of high logic amplitude by the level shift circuit 236*a*. Similarly, the selection signal Sb is a signal of low logic amplitude, and is level-shifted to a selection signal Sbx of high logic amplitude by the level shift circuit 236*b*. Similarly, the selection signal Sc is a signal of low logic amplitude, and is level-shifted to a selection signal Scx of high logic amplitude by the level shift circuit 236*c*. As an example, the low logic amplitude has a low level of 0 V and a high level of 3.3 V, and the high logic amplitude has a low level of 0 V and a high level of 42 V.

The selection signal Sax from the level shift circuit 236*a* is supplied to the positive control end of the transfer gate 234*a*, is logically inverted by the logic inversion circuit 232*a*, and is supplied to the negative control end of the transfer gate 234*a*. Similarly, the selection signal Sbx from the level shift circuit 236*b* is supplied to the positive control end of the transfer gate 234*b*, is logically inverted by the logic inversion circuit 232*b*, and is supplied to the negative control end of the transfer gate 234*b*. Similarly, the selection signal Scx from the level shift circuit 236*c* is supplied to the positive control end of the transfer gate 234*c*, is logically inverted by the logic inversion circuit 232*c*, and is supplied to the negative control end of the transfer gate 234*c*.

The driving signal COMA is supplied to an input end of the transfer gate 234*a*, and the driving signal COMB is supplied to an input end of the transfer gate 234*b*. The output ends of the transfer gates 234*a* and 234*b* are commonly coupled to each other in common and coupled to one end of the piezoelectric element 60 of the discharge section 600.

The input end of the transfer gate 234*c* is coupled to one end of the piezoelectric element 60 of the discharge section 600 as well as the output ends of the transfer gates 234*a* and 234*b*. As illustrated in FIG. 7, the output end of the transfer gate 234*c* is commonly coupled to the output ends of the transfer gates 234*c* of all other selection circuits 230 of the switching circuit 70.

When the selection signal Sax is at a high level, the transfer gate 234*a* conducts between the input end and the output end, and when the selection signal Sax is at a low level, the transfer gate 234*a* makes the coupling between the input end and the output end non-conductive. In the following, conduction will be referred to as "on", and non-conduction will be referred to as "off". Similarly, the transfer gates 234*b* and 234*c* are turned on and off between the input end and the output end according to the selection signals Sbx and Scx.

When the transfer gate 234*a* is turned on, the driving signal COMA is supplied to one end of the piezoelectric element 60 as the driving signal VOUT, and when the transfer gate 234*b* is turned on, the driving signal COMB is supplied to one end of the piezoelectric element 60 as the driving signal VOUT. In addition, when the transfer gate 234 c is turned on, the inspection target signal PO having a waveform based on the residual vibration generated in the discharge section 600 is output to the inspection circuit 80.

As described above, the logic levels of the selection signals Sa, Sb, and Sc are determined based on each piece of the print data (SIH, SIM, SIL) included in the print data signal SI, and the driving signal VOUT output from the selection circuit 230 is a voltage having any driving waveform illustrated in FIG. 6. That is, based on the print data signal SI, the selection circuit 230 performs a selection operation of selecting whether or not to apply the voltage of each of the trapezoidal waveforms Adp1, Adp2, and Bdp1, which are a plurality of driving waveforms, included in the driving signal COM including the driving signal COMA and the driving signal COMB, to the piezoelectric element 60. Specifically, the selection circuit 230 selects whether or not to apply the voltage of the trapezoidal waveform Adp1 to the piezoelectric element 60 in the period T1 according to the selection signal Sa, and whether or not to apply the voltage of the trapezoidal waveform Adp2 to the piezoelectric element 60 in the period T2. Since the transition from the period T1 to the period T2 is performed by the change signal CH, the change signal CH is a signal for switching the selection operation of the selection circuit 230.

1-6. Configuration of Drive Circuit

Hereinafter, the drive circuit 50 will be described. In the following description, driving data dA1 to dA4 are referred to as driving data dA, driving data dB1 to dB4 are referred to as driving data dB, output control signals OEB1 to OEB4 are referred to as the output control signal OEB, driving signals COMA-1 to COMA-4 are referred to as the driving signal COMA, and driving signals COMB-1 to COMB-4 are referred to as the driving signal COMB.

Figure 10:
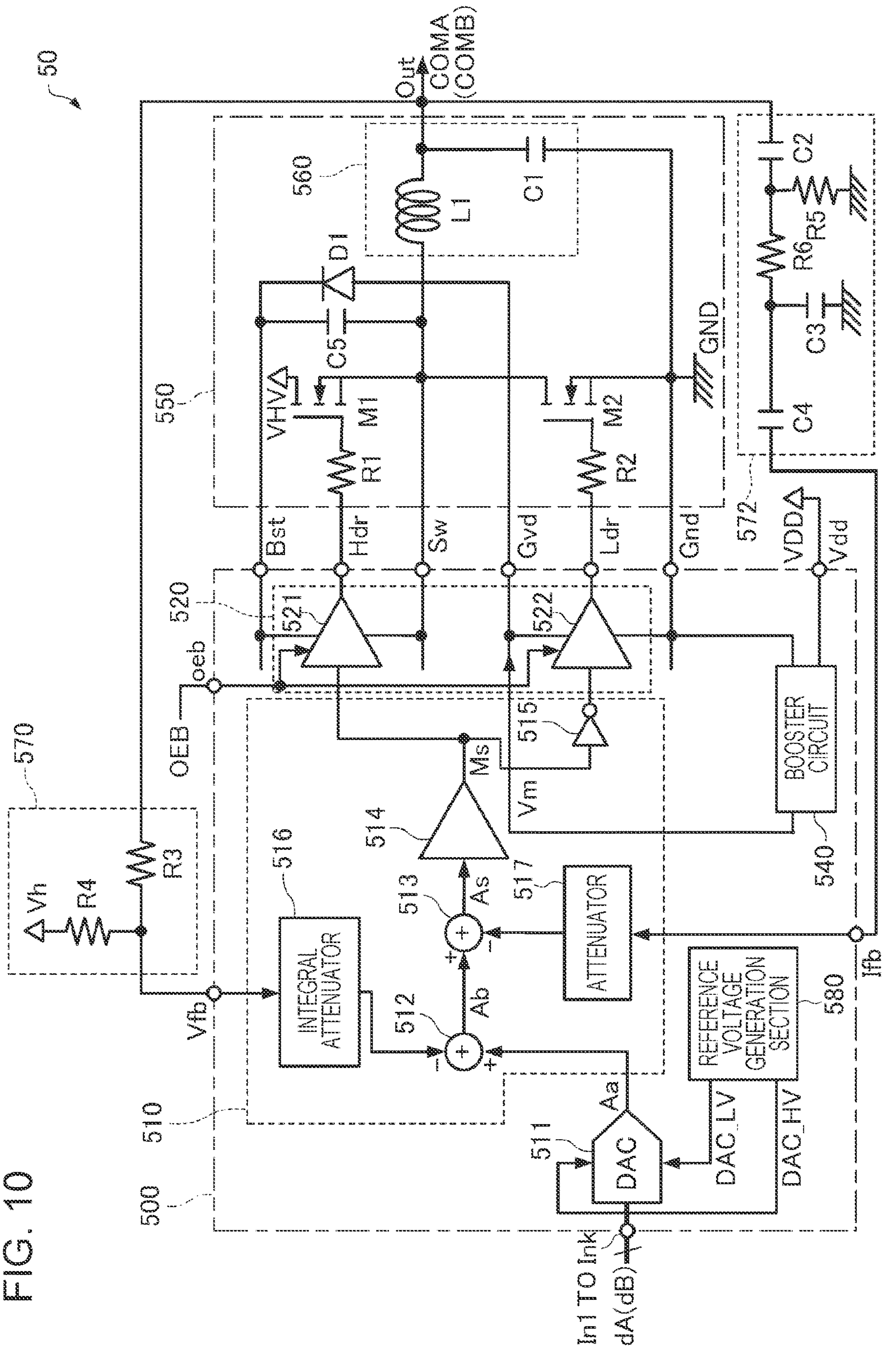
FIG. 10 is a view illustrating a circuit configuration of a drive circuit.

FIG. 10 is a view illustrating a circuit configuration of the drive circuit 50. As illustrated in FIG. 10, the drive circuit 50 includes an integrated circuit device 500, an output circuit 550, a first feedback circuit 570, and a second feedback circuit 572.

The integrated circuit device 500 outputs an amplification control signal as a gate signal to each of a first transistor M1 and a second transistor M2 based on k-bit driving data dA or dB input via terminals In1 to Ink. Therefore, the integrated circuit device 500 includes a DAC 511, an adder 512, an adder 513, a comparator 514, a logic inversion circuit 515, an integral attenuator 516, an attenuator 517, a first gate driver 521, a second gate driver 522, a booster circuit 540, and a reference voltage generation section 580. DAC is an abbreviation for digital to analog converter.

The reference voltage generation section 580 generates a first reference voltage DAC_HV that is a reference voltage on the high voltage side and a second reference voltage DAC_LV that is a reference voltage on the low voltage side, and supplies the generated voltages to the DAC 511.

The DAC 511 converts the k-bit driving data dA or driving data dB that defines the waveform of the driving signal COMA into an original driving signal Aa having a voltage between the first reference voltage DAC_HV and the second reference voltage DAC_LV, and supplies the converted signals to the input end (+) of the adder 512. The voltage amplitude of the original driving signal Aa has a maximum value and a minimum value determined by the first reference voltage DAC_HV and the second reference voltage DAC_LV, respectively, and the signal having an amplified voltage becomes the driving signal COMA or the driving signal COMB. That is, the original driving signal Aa is a target signal before amplification of the driving signal COMA or the driving signal COMB. As an example, the voltage amplitude of the original driving signal Aa is approximately 1 to 2 V.

The integral attenuator 516 attenuates and integrates the voltage of a terminal Out input via a terminal Vfb, that is, the driving signal COMA, and supplies the driving signal COMA to the input end (−) of the adder 512.

The adder 512 subtracts the voltage of the input end (−) from the voltage of the input end (+) and supplies the signal Ab of the integrated voltage to the input end (+) of the adder 513.

The power supply voltage of the circuit from the DAC 511 to the logic inversion circuit 515 is the low power supply voltage VDD supplied from the power supply circuit 112 illustrated in FIG. 4, for example, 3.3 V with a low amplitude. Therefore, while the voltage of the original driving signal Aa is approximately 2 V at maximum, the voltage of the driving signal COMA may exceed 40 V at maximum. Therefore, the voltage of the driving signal COMA is attenuated by the integral attenuator 516 in order to match the amplitude ranges of the two voltages when obtaining the deviation.

The attenuator 517 attenuates the high frequency component of the driving signal COMA input via a terminal Ifb and supplies the high frequency component to the input end (−) of the adder 513. The adder 513 supplies a signal As having a voltage obtained by subtracting the voltage of the input end (−) from the voltage of the input end (+), to the comparator 514. The function of the attenuator 517 is modulation gain adjustment, that is, sensitivity adjustment. That is, the frequency and duty ratio of a modulation signal Ms change according to the driving data dA or the driving data dB, and the attenuator 517 adjusts these change amounts.

The voltage of the signal As output from the adder 513 is a voltage obtained by subtracting the attenuated voltage of the signal supplied to the terminal Vfb from the voltage of the original driving signal Aa, and further subtracting the attenuated voltage of the signal supplied to the terminal Ifb. Therefore, regarding the voltage of the signal As by the adder 513, deviation obtained by subtracting the attenuated voltage of the driving signal COMA or the driving signal COMB output from the terminal Out, from the target voltage of the original driving signal Aa, can be referred to as a signal corrected by the high frequency component of the driving signal COMA or the driving signal COMB.

The comparator 514 outputs modulation signal Ms pulse-modulated as follows based on the voltage subtracted by adder 513. Specifically, the comparator 514 outputs the modulation signal Ms that becomes a high level when the signal As output from the adder 513 is equal to or higher than a voltage threshold value Vth1 when the voltage rises, and becomes a low level when the signal As falls below a voltage threshold value Vth2 when the voltage drops. As will be described later, the voltage threshold values are set to have a relationship of Vth1>Vth2.

The modulation signal Ms from the comparator 514 is supplied to the second gate driver 522 after undergoing logic inversion by the logic inversion circuit 515. On the other hand, the modulation signal Ms is supplied to the first gate driver 521 without logic inversion. Therefore, the logic levels supplied to the first gate driver 521 and the second gate driver 522 are in a relationship exclusive to each other.

The logic levels supplied to the first gate driver 521 and the second gate driver 522 may be actually timing-controlled such that the logic levels do not become high level at the same time, that is, such that the first transistor M1 and the second transistor M2 are not turned on at the same time.

Incidentally, the modulation signal here is narrowly defined as the modulation signal Ms, but considering that the signal is pulse-modulated according to the original driving signal Aa, the negative signal of the modulation signal Ms is also included in the modulation signal. That is, the modulation signal pulse-modulated according to the original driving signal Aa includes not only the modulation signal Ms but also the modulation signal Ms of which logic level is inverted or timing-controlled.

Note that the adder 512, the adder 513, the comparator 514, the logic inversion circuit 515, the integral attenuator 516, and the attenuator 517 function as a modulation section 510 that modulates the original driving signal Aa and generates the modulation signal Ms.

The first gate driver 521 level-shifts the low logic amplitude which is an output signal of the comparator 514 to a high logic amplitude, and outputs the signal from a terminal Hdr. The higher side of the power supply voltage of the first gate driver 521 is a voltage applied via a terminal Bst, and the lower side is a voltage applied via a terminal Sw. The terminal Bst is coupled to one end of a capacitor C5 and the cathode electrode of a diode D1 for preventing a reverse flow. The terminal Sw is coupled to the source electrode of the first transistor M1, the drain electrode of the second transistor M2, the other end of the capacitor C5, and one end of the inductor L1. The anode electrode of the diode D1 is coupled to the terminal Gvd and is applied with a voltage Vm output by the booster circuit 540. Therefore, the potential difference between the terminal Bst and the terminal Sw is approximately equal to the potential difference between both ends of the capacitor C5, that is, the voltage Vm. As an example, the voltage Vm is 7.5 V.

The second gate driver 522 operates on the lower potential side than that of the first gate driver 521. The second gate driver 522 level-shifts the low logic amplitude which is an output signal of the logic inversion circuit 515 to a high logic amplitude, and outputs the signal from a terminal Ldr. As an example, the low logic amplitude has a low level of 0 V and a high level of 3.3 V, and the high logic amplitude has a low level of 0 V and a high level of 7.5 V. Among the power supply voltages of the second gate driver 522, the voltage Vm is applied as the higher side, and the ground voltage GND supplied from the power supply circuit 112 via the ground terminal Gnd is applied as the lower side. That is, the ground terminal Gnd is grounded.

The first transistor M1 and the second transistor M2 are, for example, N channel type FETs. FET is an abbreviation for field effect transistor. Among them, in the high-side first transistor M1, the high power supply voltage VHV supplied from the power supply circuit 112 is applied to the drain electrode, and the gate electrode is coupled to the terminal Hdr through a resistor R1. As for the low-side second transistor M2, the gate electrode is coupled to the terminal Ldr via the resistor R2, and the source electrode is grounded.

Therefore, when the first transistor M1 is off and the second transistor M2 is on, the voltage of the terminal Sw is 0 V and the voltage Vm is applied to the terminal Bst. On the other hand, when the first transistor M1 is on and the second transistor M2 is off, the high power supply voltage VHV is applied to the terminal Sw, and the voltage VHV+Vm is applied to the terminal Bst.

That is, the first gate driver 521 uses the capacitor C5 as a floating power source, and the potential of the terminal Sw, which is the reference potential, changes to 0 V or the high power supply voltage VHV according to the operation of the first transistor M1 and the second transistor M2, and accordingly, an amplification control signal, of which the low level is close to 0 V and the high level is close to the voltage Vm, or the low level is close to the high power supply voltage VHV and the high level is close to the voltage VHV+Vm, is output. On the other hand, in the second gate driver 522, regardless of the operation of the first transistor M1 and the second transistor M2, the potential of the ground terminal Gnd, which is the reference potential, is fixed to 0 V, and accordingly, an amplification control signal, of which the low level is close to 0 V and the high level is close to the voltage Vm, is output.

In addition, the first gate driver 521 and the second gate driver 522 function as a gate driver 520 that generates an amplification control signal based on the modulation signal Ms. Further, the first transistor M1 and the second transistor M2 function as an amplifier circuit that generates an amplified modulation signal obtained by amplifying the modulation signal Ms.

The other end of the inductor L1 is the terminal Out which is the output of the drive circuit 50, and the driving signal COMA or the driving signal COMB is supplied to each of the selection circuits 230 from the terminal Out.

The terminal Out is coupled to one end of the capacitor C1, one end of the capacitor C2, and one end of the resistor R3. Among them, the other end of the capacitor C1 is grounded. Therefore, the inductor L1 and the capacitor C1 function as a low pass filter 560 that smoothes (demodulates) the amplified modulation signal appearing at the coupling point between the first transistor M1 and the second transistor M2 to generate a driving signal.

The other end of the resistor R3 is coupled to the terminal Vfb and one end of the resistor R4, and a voltage Vh is applied to the other end of the resistor R4. As a result, the driving signal COMA or the driving signal COMB that passed through the first feedback circuit 570 composed of the resistor R3 and the resistor R4 is pulled up from the terminal Out and fed back to the terminal Vfb.

On the other hand, the other end of the capacitor C2 is coupled to one end of the resistor R5 and one end of the resistor R6. Among them, the other end of the resistor R5 is grounded. Therefore, the capacitor C2 and the resistor R5 function as a high pass filter that passes high frequency components equal to or higher than the cutoff frequency contained in the driving signal COMA or the driving signal COMB from the terminal Out. The cutoff frequency of the high pass filter is set to, for example, approximately 9 MHz.

The other end of the resistor R6 is coupled to one end of the capacitor C4 and one end of the capacitor C3. Among them, the other end of the capacitor C3 is grounded. Therefore, the resistor R6 and the capacitor C3 function as a low pass filter that passes low frequency components equal to or lower than the cutoff frequency among the signal components that passed through the high pass filter. The cutoff frequency of the LPF is set to, for example, approximately 160 MHz.

Since the cutoff frequency of the high pass filter is set lower than the cutoff frequency of the low pass filter, the high pass filter and the low pass filter function as a band pass filter that passes the high frequency components in a predetermined frequency range contained in the driving signal COMA or the driving signal COMB.

The other end of the capacitor C4 is coupled to the terminal Ifb of the integrated circuit device 500. As a result, at the terminal Ifb, among the high frequency components of the driving signal COMA or the driving signal COMB that passes through the second feedback circuit 572 that includes the capacitor C2, the resistor R5, the resistor R6, the capacitor C3, and the capacitor C4 and functions as the band pass filter, a DC component is cut and fed back.

Incidentally, the driving signal COMA or the driving signal COMB output from the terminal Out is a signal obtained by smoothing an amplified modulation signal at the terminal Sw, which is the coupling point between the first transistor M1 and the second transistor M2, by a low pass filter including the inductor L1 and the capacitor C1. The driving signal COMA or the driving signal COMB is integrated and subtracted via the terminal Vfb and then fed back to the adder 512. Therefore, self-oscillation occurs at a frequency determined by the feedback delay, which is the sum of the delay due to the smoothing of the inductor L1 and the capacitor C1 and the delay due to the integral attenuator 516, and the feedback transfer function.

However, since the feedback path via the terminal Vfb has a large delay amount, there is a case where the frequency of self-oscillation cannot be high enough to ensure the accuracy of the driving signal COMA or the driving signal COMB only by the feedback via the terminal Vfb.

Therefore, in the present embodiment, by providing a path for feeding back the high frequency component of the driving signal COMA or the driving signal COMB via the terminal Ifb separately from the path via the terminal Vfb, the delay in the entire circuit is reduced. Therefore, the frequency of the signal As obtained by adding the high frequency component of the driving signal COMA to the signal Ab becomes high enough to ensure the accuracy of the driving signal COMA or the driving signal COMB compared to the case where there is no path via the terminal Ifb.

Figure 11:
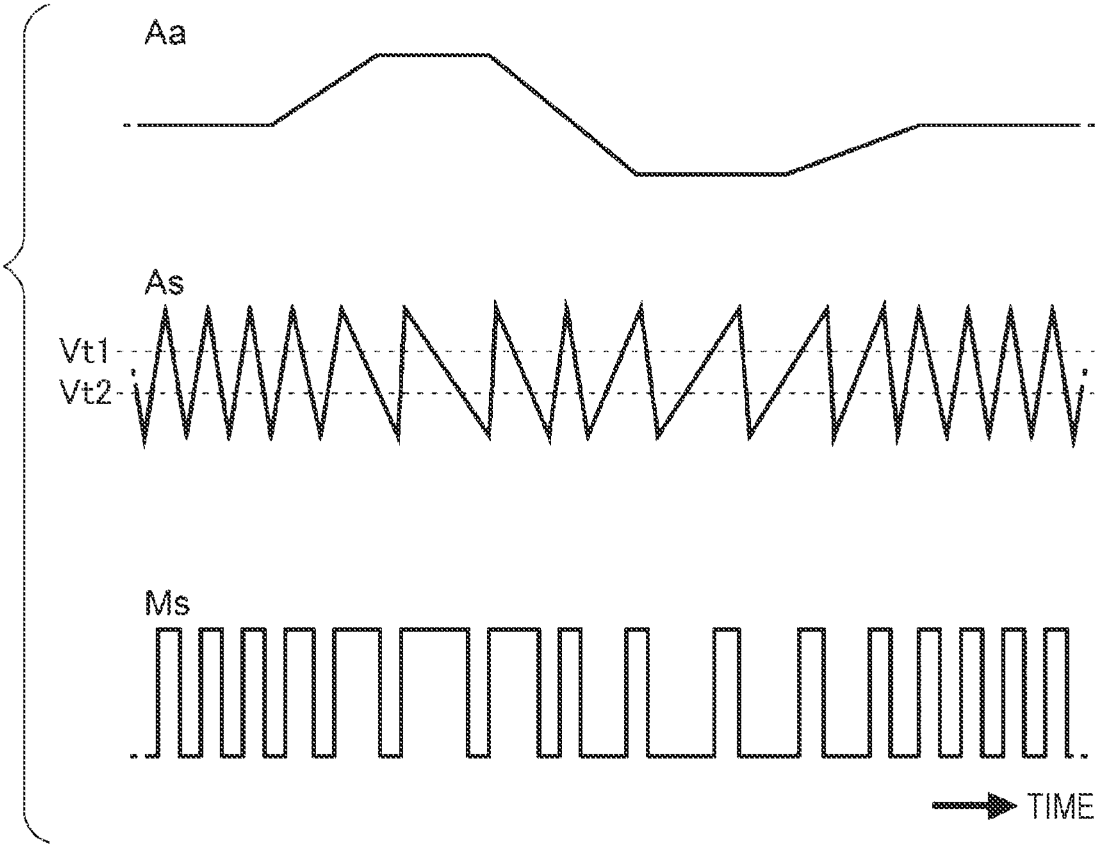
FIG. 11 is a view for describing an operation of the drive circuit.

FIG. 11 is a diagram illustrating the waveforms of the signal As and the modulation signal Ms in association with the waveform of the original driving signal Aa.

As illustrated in FIG. 11, the signal As is a triangular wave, and the oscillation frequency thereof varies according to the voltage of the original driving signal Aa. Specifically, the oscillation frequency becomes highest when the voltage of the original driving signal Aa has an intermediate value, and decreases as the voltage of the original driving signal Aa increases or decreases from the intermediate value.

In addition, when the voltage of the original driving signal Aa is near the intermediate value, the slope of the triangular wave in the signal As is substantially equal between the upward slope where the voltage rises and the downward slope where the voltage drops. Therefore, the duty ratio of the modulation signal Ms, which is the result of comparing the signal As with the voltage threshold values Vth1 and Vth2 by the comparator 514, is approximately 50%. When the voltage of the original driving signal Aa increases from the intermediate value, the downward slope of the signal As becomes gentle. As a result, the period in which the modulation signal Ms is at a high level becomes relatively long, and the duty ratio becomes large. On the other hand, as the voltage of the original driving signal Aa decreases from the intermediate value, the rising slope of the signal As becomes gentler. Therefore, the period in which the modulation signal Ms is at a high level becomes relatively short, and the duty ratio becomes small.

Therefore, the modulation signal Ms becomes a pulse density modulation signal as follows. That is, the duty ratio of the modulation signal Ms is approximately 50% at the intermediate value of the voltage of the original driving signal Aa, increases as the voltage of the original driving signal Aa becomes higher than the intermediate value, and decreases as the voltage of the original driving signal Aa decreases from the intermediate value.

The first gate driver 521 turns on/off the first transistor M1 based on the modulation signal Ms. That is, the first gate driver 521 turns on the first transistor M1 when the modulation signal Ms is at a high level, and turns off the first transistor M1 when the modulation signal Ms is at a low level. The second gate driver 522 turns on/off the second transistor M2 based on the logic inversion signal of the modulation signal Ms. That is, the second gate driver 522 turns off the second transistor M2 when the modulation signal Ms is at a high level, and turns on the second transistor M2 when the modulation signal Ms is at a low level.

Therefore, the voltage of the driving signal COMA or the driving signal COMB obtained by smoothing the amplified modulation signal at the coupling point of the first transistor M1 and the second transistor M2 with the inductor L1 and the capacitor C1 increases as the duty ratio of the modulation signal Ms increases, and decreases as the duty ratio decreases. As a result, the driving signal COMA or the driving signal COMB is controlled to be a signal obtained by expanding the voltage of the original driving signal Aa, and is output.

Since this drive circuit 50 uses pulse density modulation, there is an advantage of being able to obtain a large change range of the duty ratio compared to pulse width modulation with a fixed modulation frequency.

That is, the minimum positive pulse width and negative pulse width that can be handled by the entire circuit are restricted by the circuit characteristics. Therefore, with fixed-frequency pulse width modulation, only a predetermined range, for example, a range from 10% to 90%, can be ensured as the change range in the duty ratio. On the other hand, in pulse density modulation, the oscillation frequency decreases as the voltage of the original driving signal Aa moves away from the intermediate value. Therefore, the duty ratio can be increased in the region where the voltage of the original driving signal Aa is high, and the duty ratio can be decreased in a region where the voltage of the original driving signal Aa is low. Therefore, in the self-oscillation type pulse density modulation, it is possible to ensure a wider range, for example, a range from 5% to 95%, as the change range of the duty ratio.

Further, the drive circuit 50 is a self-oscillation circuit that includes a signal path through which the driving signal COMA or the driving signal COMB, the modulation signal Ms, and the amplified modulation signal are propagated, and self-oscillates, and a circuit for generating a high frequency transport wave, unlike the separately excited oscillation, is not required. Therefore, there is an advantage that it is easy to integrate the part other than the circuit handling high voltage, that is, the part of the integrated circuit device 500.

In addition, in the drive circuit 50, as a feedback path for the driving signal COMA or the driving signal COMB, there is not only a path via the terminal Vfb but also a path for feeding back high frequency components via the terminal Ifb, and thus the delay in the entire circuit is reduced. As a result, the frequency of self-oscillation is increased, such that the drive circuit 50 can accurately generate the driving signal COMA or the driving signal COMB.

Note that the first gate driver 521 and the second gate driver 522 each turn on/off the first transistor M1 and the second transistor M2 according to the logic level of the modulation signal Ms when the output control signal OEB input from the terminal oeb of the integrated circuit device 500 is at a low level. As a result, the drive circuit 50 performs a self-oscillation operation, and the driving signal COMA or the driving signal COMB is output from the terminal Out.

On the other hand, when the output control signal OEB is at a high level, the first gate driver 521 and the second gate driver 522 forcibly turn off the first transistor M1 and the second transistor M2, respectively, regardless of the logic level of the modulation signal Ms. As a result, the terminal Out becomes high impedance, and the driving signal COMA or the driving signal COMB becomes the previous voltage held by the capacitive properties of the piezoelectric element 60. Therefore, in the driving signal COMA or the driving signal COMB, the control section 111 may set the output control signal OEB to a high level to stop the self-oscillation operation of the drive circuit 50 during a period when the voltage is constant, for example, during a period of the voltage Vc. Therefore, by providing a period in which the output control signal OEB is at a high level, power consumption of the drive circuit 50 is reduced, and noise generated by the operation of the drive circuit 50 is also reduced.

Returning to FIG. 10, in the example illustrated in FIG. 10, the resistor R1, the resistor R2, the first transistor M1, the second transistor M2, the capacitor C5, the diode D1, and the low pass filter 560 are configured as an output circuit 550 that generates the driving signal COMA or the driving signal COMB based on the amplification control signal and outputs the signal to the piezoelectric element 60, which is a capacitive load.

The booster circuit 540 supplies power to the gate driver 520. In the example illustrated in FIG. 10, the booster circuit 540 boosts the low power supply voltage VDD supplied from the power supply terminal Vdd with reference to the ground voltage GND of the ground terminal Gnd, thereby generating the voltage Vm that becomes a power supply voltage on the high potential side of the second gate driver 522. The booster circuit 540 can be composed of a charge pump circuit, a switching regulator, or the like, but the case of using the charge pump circuit can suppress the generation of noise compared to the case of using the switching regulator. Therefore, the drive circuit 50 can generate the driving signal COMA or the driving signal COMB with higher accuracy, the voltage applied to the piezoelectric element 60 can be controlled with higher accuracy, and thus the discharge accuracy of the liquid can be improved. In addition, since the power source generation section of the gate driver 520 is configured with a charge pump circuit and the size thereof is reduced, the power source generation section can be mounted on the integrated circuit device 500, and compared to a case where the power source generation section of the gate driver 520 is outside the integrated circuit device 500, the circuit area of the drive circuit 50 can be greatly reduced as a whole. The booster circuit 540 may be included in power supply circuit 112 illustrated in FIGS. 3A and 3B.

The drive circuit 50 configured as described above digital-to-analog converts the driving data dA or the driving data dB, and then class-D-amplifies the converted data to generate the driving signal COMA or the driving signal COMB. Here, the driving data dA and dB may be analog signals as long as the data can define the waveforms of the driving signals COMA and COMB. Further, the drive circuit 50 may amplify the signal waveform defined by the driving data dA or the driving data dB and output the driving signal COMA or the driving signal COMB. Therefore, the drive circuit 50 may generate the driving signal COMA or the driving signal COMB by performing class A amplification, class B amplification, or class AB amplification on the signal waveform defined by the driving data dA or the driving data dB.

1-7. Configuration of Inspection Circuit

Next, the configuration of the inspection circuit 80 will be described. In the following description, the inspection target signals PO1 to PO4 are referred to as the inspection target signal PO, and the determination result signals RS1 to RS4 are referred to as the determination result signal RS.

Figure 12:
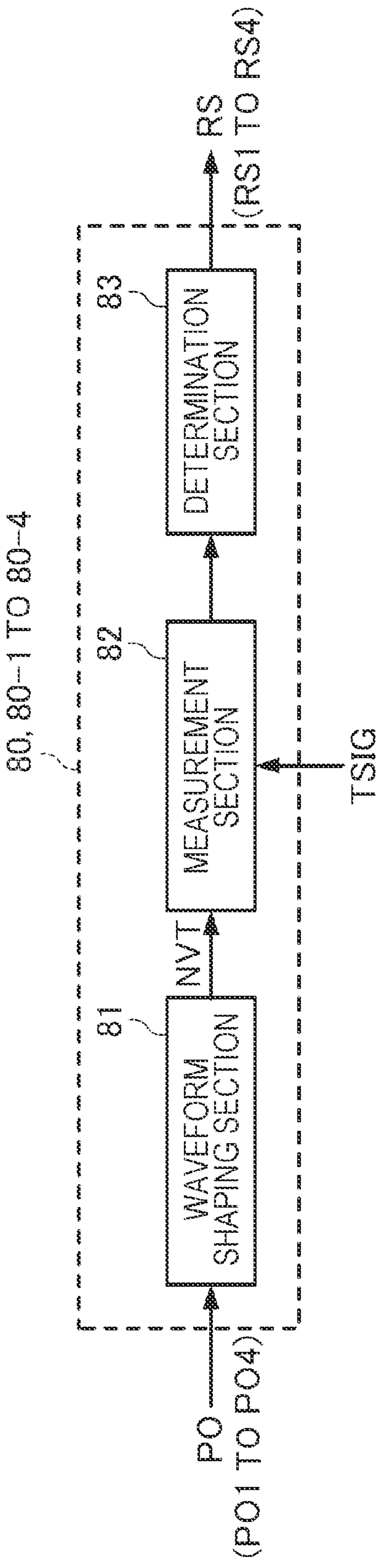
FIG. 12 is a view illustrating a configuration of an inspection circuit.

FIG. 12 is a view illustrating a configuration of the inspection circuit 80. As illustrated in FIG. 12, the inspection circuit 80 includes a waveform shaping section 81, a measurement section 82 and a determination section 83.

The waveform shaping section 81 removes noise components from the inspection target signal PO by a low pass filter or a band pass filter, and outputs a residual vibration signal NVT obtained by amplifying the amplitude of the inspection target signal PO by an operational amplifier, a resistor, or the like.

The measurement section 82 receives the residual vibration signal NVT output from the waveform shaping section 81, and measures the cycle, the amplitude, and the like of the residual vibration signal NVT in the period TS2 designated by the inspection control signal TSIG.

The determination section 83 determines the discharge state of the inspection target discharge section 600 based on the cycle, the amplitude, and the like of the residual vibration signal NVT measured by the measurement section 82, and outputs the determination result signal RS representing the determination result. The determination result signal RS may be a signal indicating the presence or absence of abnormal discharge, or may be a signal containing information for determining the cause of the abnormal discharge.

Figure 13:
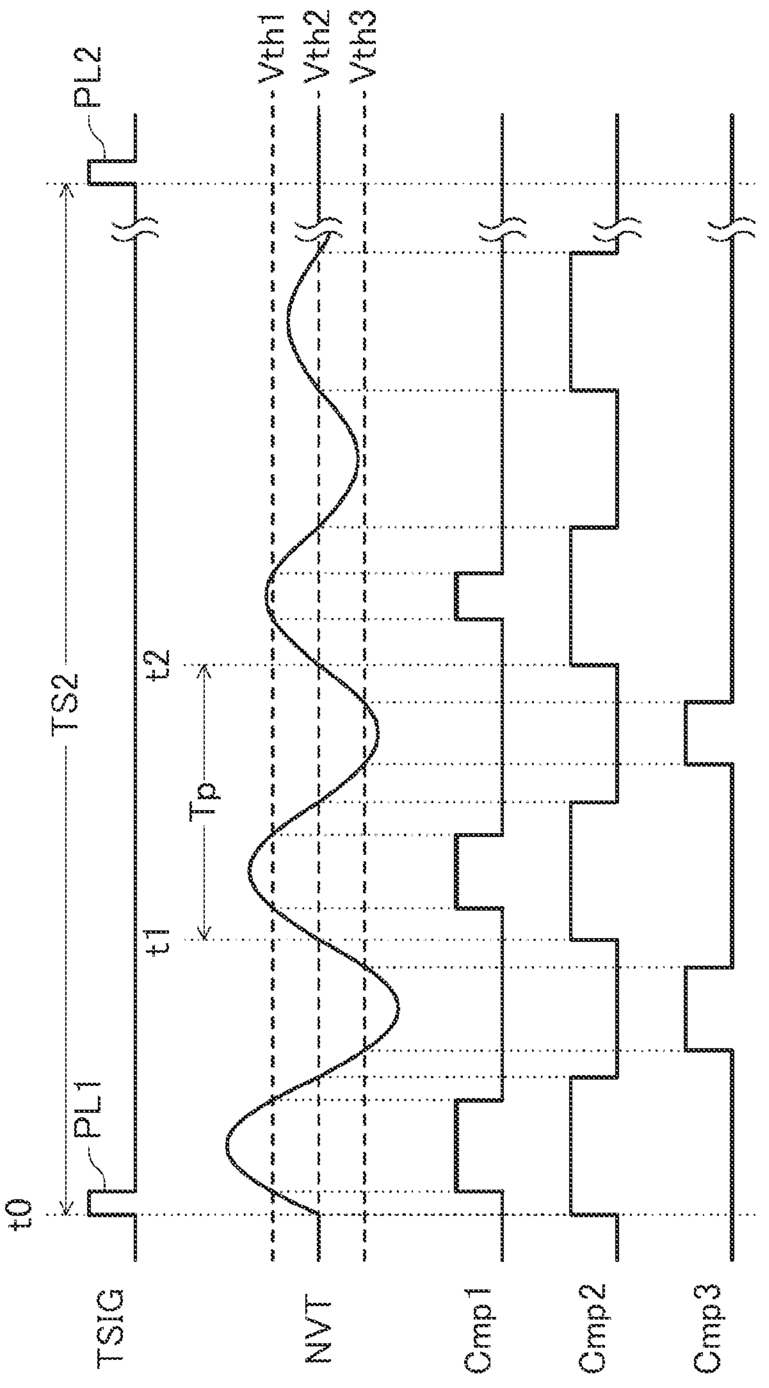
FIG. 13 is a view for describing an operation of a measurement section.

FIG. 13 is a timing chart for describing the operation of the measurement section 82. As illustrated in FIG. 13, when the period TS2 is started and the supply of the residual vibration signal NVT is started, the measurement section 82 compares the residual vibration signal NVT, the threshold potential Vth2, which is a potential at the center level of the amplitude of the residual vibration signal NVT, the threshold potential Vth1 higher than the threshold potential Vth2, and the threshold potential Vth3 lower than the threshold potential Vth2. Then, the measurement section 82 generates a comparison signal Cmp1 that becomes a high level when the potential of the residual vibration signal NVT is equal to or higher than the threshold potential Vth1, a comparison signal Cmp2 that becomes a high level when the potential of the residual vibration signal NVT becomes the threshold potential Vth2, and a comparison signal Cmp3 that becomes a high level when the potential of the residual vibration signal NVT is less than the threshold potential Vth3.

After the start time t0 of the period TS2, the measurement section 82 measures the time Tp from the time t1 when the comparison signal Cmp2 first falls to a low level and then rises to a high level, to the time t2 when the comparison signal Cmp2 next falls to a low level and then rises to a high level.

For example, the measurement section 82 can count the number of pulses of the clock signal SCK from the time t1 to the time t2 and use the count value as the time Tp.

Further, when the amplitude of the residual vibration signal NVT is small, it is assumed that abnormal discharge occurred in the inspection target discharge section 600, such as the cavity 631 not being filled with ink. Therefore, the measurement section 82 sets an amplitude determination value Ap to "1" when the potential of the residual vibration signal NVT becomes equal to or higher than the threshold potential Vth1 and the comparison signal Cmp1 becomes a high level in the period from the time t1 to the time t2, and the potential of the residual vibration signal NVT becomes less than the threshold potential Vth3 and the comparison signal Cmp3 becomes a high level in the period from the time t1 to the time t2, and sets the amplitude determination value Ap to "0" in other cases.

Even though the discharge section 600 performed an operation for discharging ink droplets, ink droplets are not discharged normally from the nozzle 651, that is, abnormal discharge occurs. Causes thereof include (1) entering of bubbles in the cavity 631; (2) thickening of the ink in the cavity 631 due to drying or the like of the ink in the cavity 631; and (3) adhesion of foreign matter such as paper dust near the outlet of the nozzle 651.

First, it is considered that, when bubbles enter the cavity 631, the total weight of the ink filling the cavity 631 decreases and the inertance decreases. In addition, when bubbles adhere near the nozzle 651, it is assumed that the diameter of the nozzle 651 is increased by the size of the diameter, and it is considered that the acoustic resistance is reduced. Therefore, when bubbles enter the cavity 631 and abnormal discharge occurs, the frequency of the residual vibration becomes higher than when the discharge state is normal. Therefore, the time Tp becomes less than a predetermined threshold time Tth2.

Next, when the ink near the nozzle 651 dries and thickened, the ink in the cavity 631 becomes confined within the cavity 631. In such a case, it is considered that the acoustic resistance increases. Therefore, when the ink near the nozzle 651 in the cavity 631 thickened, the frequency of the residual vibration becomes lower than when the discharge state is normal. Therefore, the time Tp becomes longer than a predetermined threshold time Tth4.

Next, when foreign matter such as paper dust adheres near the outlet of the nozzle 651, ink seeps out from inside the cavity 631 via the foreign matter such as paper dust, and thus it is considered that the inertance increases. Moreover, it is considered that the acoustic resistance increases due to the fibers of the paper dust adhering near the outlet of the nozzle 651. Therefore, when foreign matter such as paper dust adheres near the outlet of the nozzle 651, the frequency of the residual vibration becomes lower than when the discharge state is normal. Therefore, the time Tp is longer than a predetermined threshold time Tth3 and equal to or less than the threshold time Tth4.

When there is no abnormal discharge due to the causes (1) to (3) above, that is, when the time Tp is equal to or greater than the threshold time Tth2 and equal to or less than the threshold time Tth3, it is determined that the discharge state of the discharge section 600 is normal.

As described above, the determination section 83 can determine the discharge state of the inspection target discharge section 600 based on the time Tp corresponding to the cycle of the residual vibration and the amplitude determination value Ap of the residual vibration.

FIG. 14 is a diagram illustrating an example of the determination logic of the discharge state of the discharge section 600 by the determination section 83. In the example of FIG. 14, when the amplitude determination value Ap is "0", the determination section 83 determines that some abnormal discharge such as the cavity 631 not being filled with ink occurred although the cause cannot be specified, and sets the determination result signal RS to "5". Further, when the amplitude determination value Ap is "1", the determination section 83 determines the discharge state of the discharge section 600 based on the time Tp. That is, when the time Tp is less than the threshold time Tth2, the determination section 83 determines that abnormal discharge occurred in the discharge section 600 due to bubbles, and sets the determination result signal RS to "2". Further, when the time Tp is equal to or longer than the threshold time Tth2 and equal to or less than the threshold time Tth3, the determination section 83 determines that the discharge state of the discharge section 600 is normal, and sets the determination result signal RS to "1". Further, when the time Tp is longer than the threshold time Tth3 and equal to or less than the threshold time Tth4, the determination section 83 determines that abnormal discharge occurred in the discharge section 600 due to adhesion of foreign matter, and sets the determination result signal RS to "3". Further, when the time Tp is longer than the threshold time Tth4, the determination section 83 determines that abnormal discharge occurred in the discharge section 600 due to thickening, and sets the determination result signal RS to "4".

Further, the determination result signal RS generated by the determination section 83 is five-value information from "1" to "5" in the example of FIG. 14, but for example, may be two-value information indicating whether or not to indicate the presence or absence of abnormal discharge. In addition, the determination section 83 may use only a part of the time Tp and the amplitude determination value Ap to generate the determination result signal RS.

In this manner, the inspection circuit 80 detects the residual vibration of the discharge section 600 after the voltage of the trapezoidal waveform Bdp1 included in the driving signal COMB is applied to the piezoelectric element 60, and based on the residual vibration, determines the discharge state of the inspection target discharge section 600.

1-8. Operation of Liquid Discharge Apparatus

Next, the operation of the liquid discharge apparatus 1 of the first embodiment will be described with reference to FIG. 15.

The print data signals SI are serially supplied in synchronization with the clock signal SCK and sequentially transferred in the shift register 222 that corresponds to the nozzles. In addition, when the supply of the clock signal SCK is stopped, a state where 3-bit print data (SIH, SIM, SIL) that corresponds to the nozzle 651 is held in each of the shift registers 222 is achieved. Further, the print data signal SI is supplied in order that corresponds to the nozzles on the last m stages, . . . , stage 2, and stage 1 in the shift register 222.

Here, when the latch signal LAT rises, each of the latch circuits 224 latches the 3-bit print data (SIH, SIM, SIL) held in the shift register 222 all at once. In FIG. 15, LT1, LT2, . . . , and LTm indicate the 3-bit print data (SIH, SIM, SIL) latched by the latch circuit 224 that corresponds to the shift register 222 having stage 1, stage 2, . . . , and stage m.

The decoder 226 outputs the logic level of the selection signal Sa as illustrated in FIG. 8 in each of the periods T1 and T2 according to the latched 3-bit print data (SIH, SIM, SIL), and outputs the logic levels of the selection signals Sb and Sc as illustrated in FIG. 8 in each of the periods TS1, TS2, and TS3.

That is, when the print data (SIH, SIM, SIL) is (1, 1, 0), the decoder 226 sets the selection signal Sa to a high level and a high level in the periods T1 and T2, and sets the selection signals Sb and Sc to a low level, a low level, and a low level in the periods TS1, TS2, and TS3. Further, when the print data (SIH, SIM, SIL) is (1, 0, 0), the decoder 226 sets the selection signal Sa to a high level and a low level in the periods T1 and T2, and sets the selection signals Sb and Sc to a low level, a low level, and a low level in the periods TS1, TS2, and TS3. Further, when the print data (SIH, SIM, SIL) is (0, 1, 0), the decoder 226 sets the selection signal Sa to a low level and a high level in the periods T1 and T2, and sets the selection signals Sb and Sc to a low level, a low level, and a low level in the periods TS1, TS2, and TS3. Further, when the print data (SIH, SIM, SIL) is (0, 0, 0), the decoder 226 sets the selection signal Sa to a low level and a low level in the periods T1 and T2, and sets the selection signals Sb and Sc to a low level, a low level, and a low level in the periods TS1, TS2, and TS3. Further, when the print data (SIH, SIM, SIL) is (1, 1, 1), the decoder 226 sets the selection signal Sa to a low level and a low level in the periods T1 and T2, sets the selection signal Sb to a high level, a low level, and a high level in the periods TS1, TS2, and TS3, and sets the selection signal Sc to a low level, a high level, and a low level in the periods TS1, TS2, and TS3.

When the print data (SIH, SIM, SIL) is (1, 1, 0), the selection circuit 230 selects the trapezoidal waveform Adp1 of the driving signal COMA because the selection signal Sa is a high level in the period T1, and selects the trapezoidal waveform Adp2 of the driving signal COMA because the selection signal Sa is a high level in the period T2. In addition, the selection circuit 230 does not select the driving signal COMB because the selection signal Sb is a low level in the periods TS1, TS2, and TS3. As a result, the driving signal VOUT that corresponds to the "large dot" illustrated in FIG. 6 is generated.

When the print data (SIH, SIM, SIL) is (1, 0, 0), the selection circuit 230 selects the trapezoidal waveform Adp1 of the driving signal COMA because the selection signal Sa is a high level in the period T1, and does not select the driving signal COMA because the selection signal Sa is L in the period T2. In addition, the selection circuit 230 does not select the driving signal COMB because the selection signal Sb is a low level in the periods TS1, TS2, and TS3. As a result, the driving signal VOUT that corresponds to the "medium dot" illustrated in FIG. 6 is generated.

When the print data (SIH, SIM, SIL) is (0, 1, 0), the selection circuit 230 does not select the driving signal COMA since the selection signal Sa is a low level in the period T1, and selects the trapezoidal waveform Adp2 of the driving signal COMA since the selection signal Sa is a high level in the period T2. In addition, the selection circuit 230 does not select the driving signal COMB because the selection signal Sb is a low level in the periods TS1, TS2, and TS3. As a result, the driving signal VOUT that corresponds to the "small dot" illustrated in FIG. 6 is generated.

When the print data (SIH, SIM, SIL) is (0, 0, 0), the selection circuit 230 selects the driving signal COMA because the selection signal Sa is a low level in the periods T1 and T2. In addition, the selection circuit 230 does not select the driving signal COMB because the selection signal Sb is a low level in the periods TS1, TS2, and TS3. As a result, the driving signal VOUT that corresponds to the "non-recording" illustrated in FIG. 6 is generated.

When the print data (SIH, SIM, SIL) is (1, 1, 1), the selection circuit 230 selects the driving signal COMA because the selection signal Sa is a low level in the periods T1 and T2. In addition, the selection circuit 230 selects the trapezoidal waveform Bdp1 of the driving signal COMB because the selection signal Sb is a high level in the periods TS1 and TS3, and does not select the driving signal COMB because the selection signal Sb is a low level in the period TS2. As a result, the driving signal VOUT corresponding to "inspection" illustrated in FIG. 6 is generated in the periods TS1 and TS3. The selection circuit 230 turns off the transfer gate 234*c* because the selection signal Sc is a low level in the periods TS1 and TS3, and turns on the transfer gate 234*c* because the selection signal Sc is a high level in the period TS2. As a result, the inspection target signal PO is generated in the period TS2.

The inspection circuit 80 detects the residual vibration of the inspection target discharge section 600 in the period TS2, and transmits the determination result signal RS, which is the data of the detection result of residual vibration, to the control section 111 in the period Tx included in the period TS3.

In this manner, the period TS2 is a period in which the inspection circuit 80 detects the residual vibration of the inspection target discharge section 600, and the residual vibration is minute. Therefore, when affected by noise, there is a concern that the detection accuracy of the residual vibration detection section 120 deteriorates. In particular, since the drive circuit 50 generates the high voltage driving signals COMA and COMB through the switching operations of the first transistor M1 and the second transistor M2, it is necessary to consider that the switching noise of the drive circuit 50 does not affect the detection of residual vibration.

Therefore, in the present embodiment, when the residual vibration detection section 120 configured with the inspection circuits 80-1 to 80-4 detects the residual vibration, the control section 111 stops the driving signal generation section 110 configured with the drive circuits 50-1 to 50-4. For example, the control section 111 may cause the residual vibration detection section 120 to start detecting residual vibration after stopping the driving signal generation section 110. Further, the control section 111 may release the stoppage of the driving signal generation section 110 after causing the residual vibration detection section 120 to end the detection of residual vibration.

Figure 15:
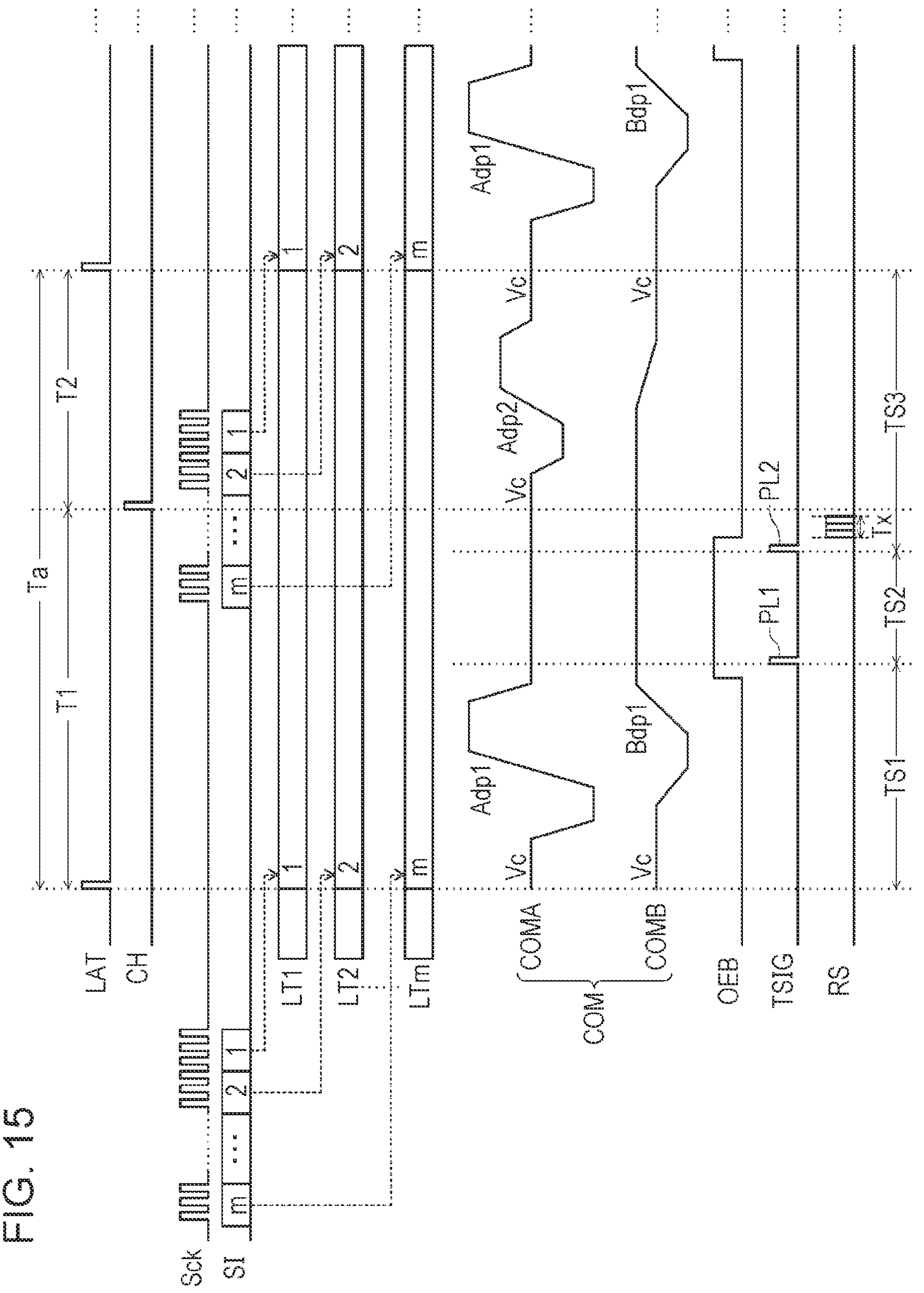
FIG. 15 is a diagram for describing an example of an operation of a liquid discharge apparatus according to a first embodiment.

Specifically, as illustrated in FIG. 15, the control section 111 changes the output control signal OEB from a low level to a high level to stop the drive circuit 50, and then causes the inspection circuit 80 to start detecting the residual vibration by the first pulse PL1 of the inspection control signal TSIG. After causing the inspection circuit 80 to end the detection of residual vibration by the second pulse PL2 of the inspection control signal TSIG, the control section 111 changes the output control signal OEB from a high level to a low level to release the stoppage of the drive circuit 50. As a result, the drive circuit 50 is stopped in the period TS2 from the rise of the first pulse PL1 to the rise of the second pulse PL2, and thus a concern that the detection accuracy of residual vibration by the inspection circuit 80 is lowered is reduced.

In addition, the start of the detection of residual vibration by the residual vibration detection section 120 and the stoppage of the driving signal generation section 110 may be performed at the same time. That is, the timing at which the output control signal OEB changes from a low level to a high level and the timing at which the first pulse PL1 of the inspection control signal TSIG rises may be the same. Further, the end of the detection of residual vibration by the residual vibration detection section 120 and the release of the stoppage of the driving signal generation section 110 may be performed at the same time. That is, the timing at which the output control signal OEB changes from a high level to a low level and the timing at which the second pulse PL2 of the inspection control signal TSIG rises may be the same.

Furthermore, as illustrated in FIG. 9, in each of the selection circuit 230, the logic inversion circuits 232*a*, 232*b*, and 232*c* receive the selection signals Sax, Sbx, and Scx of high logic amplitude, respectively, and when the logic level of the selection signals Sax, Sbx, and Scx changes, a large through current flows through each of the logic inversion circuits 232*a*, 232*b*, and 232*c*. In the present embodiment, in each cycle Ta, there are four inspection target discharge sections 600, while a large number of other discharge sections 600 can execute discharge operations based on the trapezoidal waveforms Adp1 and Adp2 of the driving signal COMA. Therefore, when the logic level of the selection signal Sax changes, through currents flow simultaneously in a large number of logic inversion circuits 232*a*, which can become a large noise in the residual vibration of the inspection target discharge section 600. The logic level of the selection signal Sax can change when the change signal CH switches the selection operation of the trapezoidal waveforms Adp1 and Adp2 by the selection circuit 230.

Therefore, the control section 111 permits switching of the selection operation of the selection circuit 230 that corresponds to the non-inspection target discharge section 600 only in the period in which the residual vibration detection section 120 is not caused to detect the residual vibration. In other words, the control section 111 prohibits switching of the selection operation of the selection circuit 230 corresponding to the non-inspection target discharge section 600 in the period in which the residual vibration detection section 120 is caused to detect the residual vibration. That is, the control section 111 fixes the change signal CH to a low level in the period TS2 when the inspection circuit 80 detects the residual vibration of the inspection target discharge section 600. For example, as illustrated in FIG. 15, the control section 111 generates a pulse of the change signal CH in a period TS3 after the period TS2, after the period Tx in which the inspection circuit 80 transmits the determination result signal RS ends. As a result, switching of the selection operation does not occur in each of the selection circuits 230 in the period TS2, and thus the concern that the detection accuracy of residual vibration by the inspection circuit 80 is lowered is reduced.

The inspection target discharge section 600 is an example of the "first discharge section" of the present disclosure, and the piezoelectric element 60 of the inspection target discharge section 600 is an example of the "first piezoelectric element" of the present disclosure. Further, the selection circuit 230 that selects one of the trapezoidal waveforms Adp1, Adp2, and Bdp1, which are a plurality of driving waveforms, based on the print data signal SI and applies the selected trapezoidal waveform to the piezoelectric element 60 of the inspection target discharge section 600 is an example of the "first selection section" of the present disclosure. Further, the driving signal COM including the driving signals COMA and COMB for driving the piezoelectric element 60 of the inspection target discharge section 600 is an example of the "driving signal" of the present disclosure. Also, the trapezoidal waveform Bdp1 of the driving signal COMB is an example of the "first driving waveform". The non-inspection target discharge section 600 to which the same driving signal COM as the inspection target discharge section 600 is supplied is an example of the "second discharge section" of the present disclosure, and the piezoelectric element 60 of the non-inspection target discharge section 600 is an example of the "second piezoelectric element" of the present disclosure. In addition, the selection circuit 230 that outputs the driving signal VOUT supplied to the piezoelectric element 60 of the non-inspection target discharge section 600 is an example of the "second selection section" of the present disclosure.

1-9. Operational Effect

As described above, in the liquid discharge apparatus 1 according to the first embodiment, the control section 111 stops the driving signal generation section 110 when causing the residual vibration detection section 120 to detect residual vibration. For example, after stopping the driving signal generation section 110, the control section 111 causes the residual vibration detection section 120 to start detecting the residual vibration, and causes the residual vibration detection section 120 to end the detection of residual vibration, and then the stoppage of the driving signal generation section 110 is released. That is, the driving signal generation section 110 is stopped before the residual vibration detection section 120 starts detecting the residual vibration, the residual vibration detection section 120 ends the detection of residual vibration before the driving signal generation section 110 starts operating, and thus the driving signal generation section 110 is stopped in the period in which the residual vibration detection section 120 detects the residual vibration. Therefore, according to the liquid discharge apparatus 1 of the first embodiment, the concern that the detection accuracy of residual vibration by the residual vibration detection section 120 is lowered due to the switching noise generated by the driving signal generation section 110 is reduced.

Further, in the liquid discharge apparatus 1 according to the first embodiment, the control section 111 permits switching of the selection operation of the selection circuit 230 that corresponds to the non-inspection target discharge section 600 only in the period in which the residual vibration detection section 120 is not caused to detect the residual vibration. Therefore, according to the liquid discharge apparatus 1 according to the first embodiment, the selection operation of each of the selection circuits 230 is not switched in the period in which the residual vibration detection section 120 detects the residual vibration. Therefore, the concern that the detection accuracy of residual vibration by the residual vibration detection section 120 is lowered due to the noise generated by each of the selection circuits 230 is reduced.

2. Second Embodiment

Hereinafter, regarding the liquid discharge apparatus according to the second embodiment, the same components as those of the first embodiment will be given the same reference numerals, the description overlapping with that of the first embodiment will be omitted, and the contents different from those of the first embodiment will be mainly described.

Similar to the liquid discharge apparatus 1 according the first embodiment, in the liquid discharge apparatus 1 according to the second embodiment, when the residual vibration detection section 120 configured with the inspection circuits 80-1 to 80-4 detects the residual vibration, the control section 111 stops the driving signal generation section 110 configured with the drive circuits 50-1 to 50-4. For example, the control section 111 may cause the residual vibration detection section 120 to start detecting residual vibration after stopping the driving signal generation section 110. Further, the control section 111 may release the stoppage of the driving signal generation section 110 after causing the residual vibration detection section 120 to end the detection of residual vibration. Further, the control section 111 permits switching of the selection operation of the selection circuit 230 that corresponds to the non-inspection target discharge section 600 only in the period in which the residual vibration detection section 120 is not caused to detect the residual vibration.

However, in the liquid discharge apparatus 1 according to the first embodiment, when the determination result signal RS transmitted from the inspection circuit 80 to the control section 111 becomes erroneous data due to switching noise of the drive circuit 50, there is a concern that the processing of the control section 111 corresponding to the determination result signal RS becomes inappropriate processing.

Therefore, in the liquid discharge apparatus 1 according to the second embodiment, when the residual vibration detection section 120 transmits the determination result signal RS, which is the data of the detection result of residual vibration, the control section 111 further stops the driving signal generation section 110. For example, after stopping the driving signal generation section 110, the control section 111 may cause the residual vibration detection section 120 to start detecting the residual vibration, and may cause the residual vibration detection section 120 to end the detection of residual vibration. After this, the residual vibration detection section 120 may transmit the determination result signal RS which is the data of the detection result of residual vibration, and then, the stoppage of the driving signal generation section 110 may be released.

Figure 16:
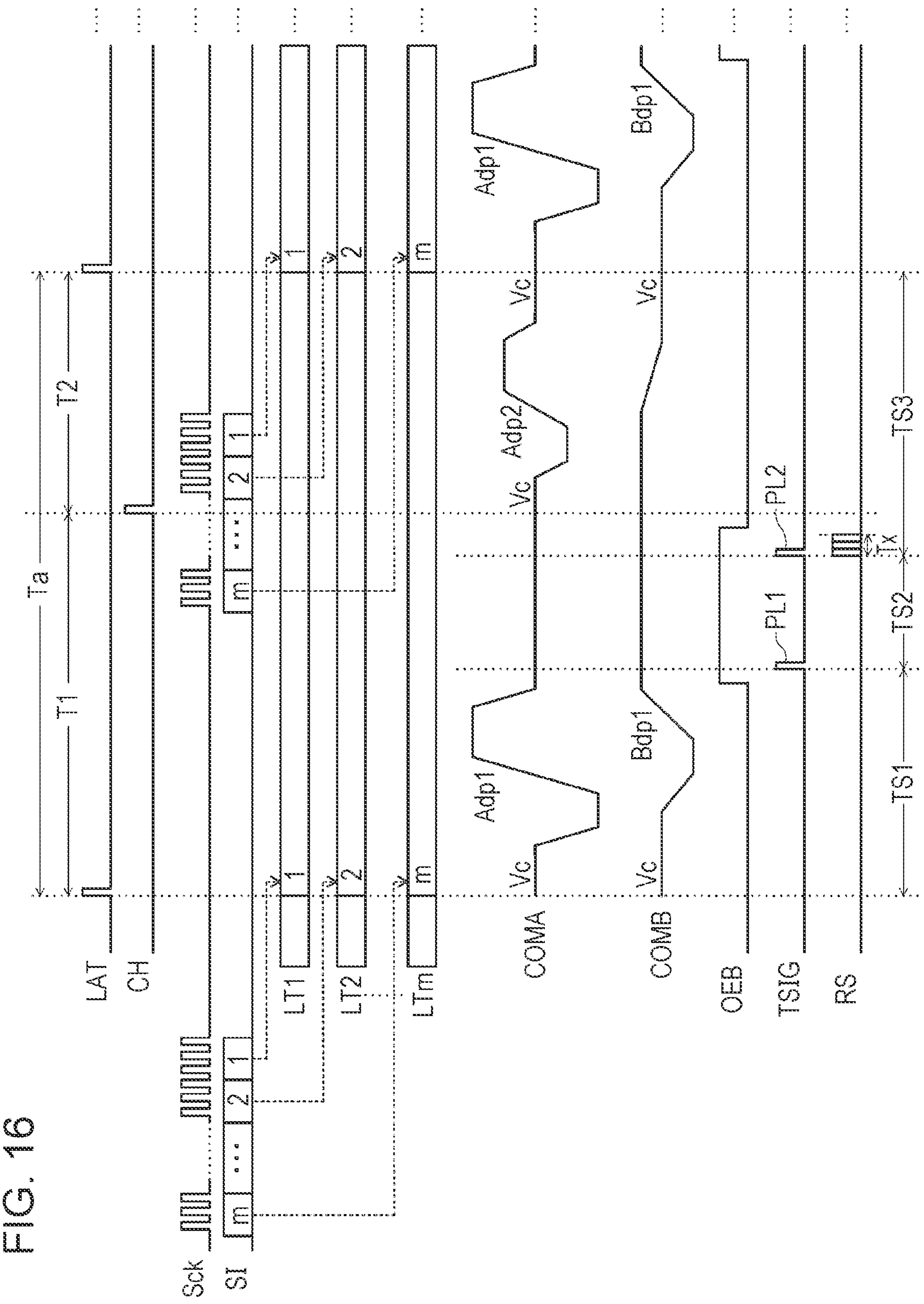
FIG. 16 is a diagram for describing an example of an operation of a liquid discharge apparatus according to a second embodiment.

In other words, as illustrated in FIG. 16, the control section 111 changes the output control signal OEB from a low level to a high level to stop the drive circuit 50, and then causes the inspection circuit 80 to start detecting the residual vibration by the first pulse PL1 of the inspection control signal TSIG, and causes the inspection circuit 80 to end the detection of residual vibration by the second pulse PL2 of the inspection control signal TSIG. The inspection circuit 80 transmits the determination result signal RS, which is the data of the detection result of the residual vibration, to the control section 111 in the period Tx included in the period TS3 after the period TS2 in which the residual vibration is detected. After the period Tx ends, the control section 111 changes the output control signal OEB from a high level to a low level to release the stoppage of the drive circuit 50. After releasing the stoppage of the drive circuit 50, the pulse of the change signal CH is generated.

For example, after stopping the driving signal generation section 110, the control section 111 may cause the residual vibration detection section 120 to start detecting the residual vibration, cause the residual vibration detection section 120 to end the detection of residual vibration, and then release the stoppage of the driving signal generation section 110. After this, the driving signal generation section 110 may be stopped again, and then the residual vibration detection section 120 may transmit the determination result signal RS which is the data of the detection result of residual vibration. After ending the transmission, the stoppage of the driving signal generation section 110 may be released.

Figure 17:
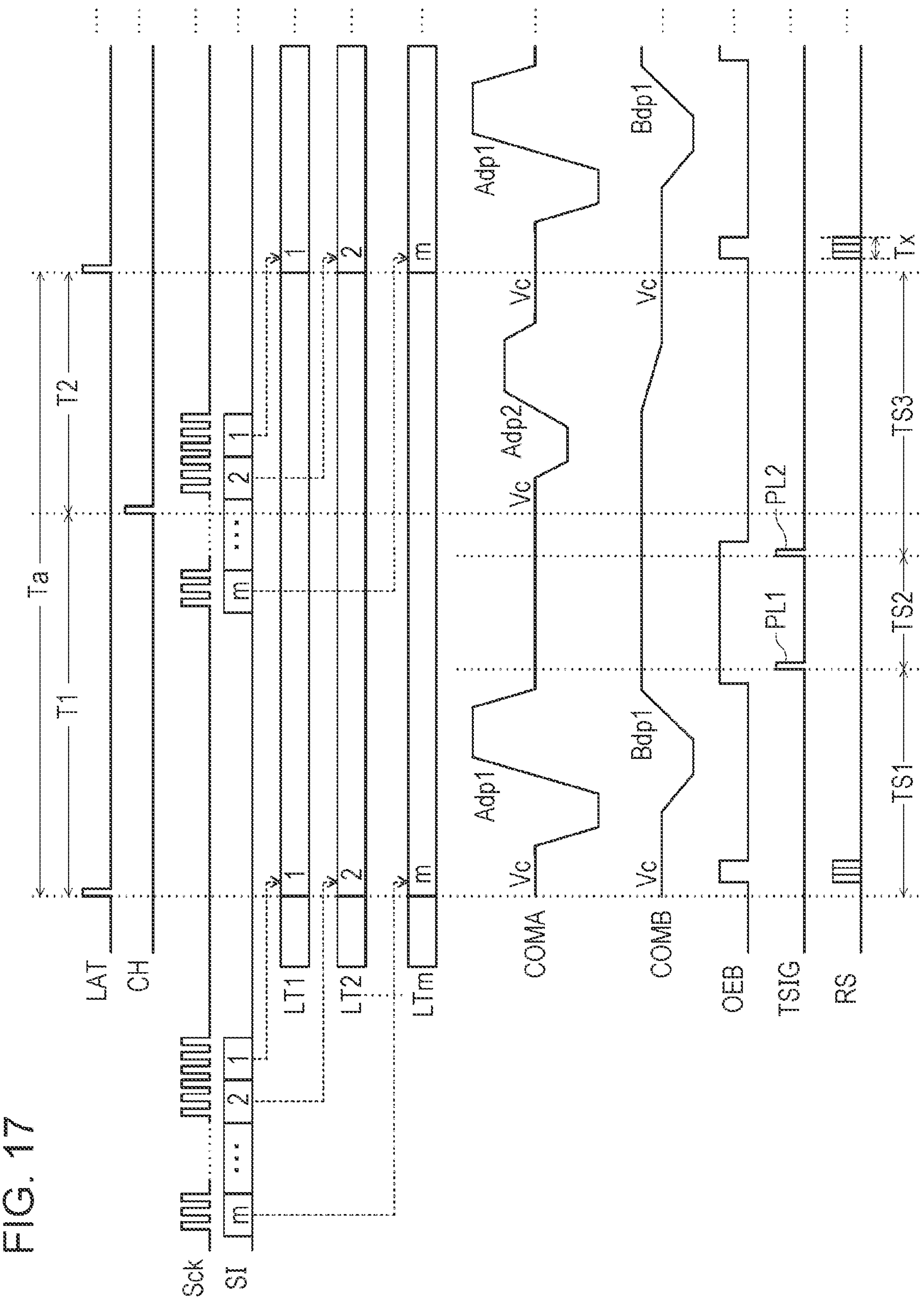
FIG. 17 is a diagram for describing another example of an operation of the liquid discharge apparatus according to the second embodiment.

For example, as illustrated in FIG. 17, the control section 111 changes the output control signal OEB from a low level to a high level to stop the drive circuit 50, and then causes the inspection circuit 80 to start detecting the residual vibration by the first pulse PL1 of the inspection control signal TSIG, and causes the inspection circuit 80 to end the detection of residual vibration by the second pulse PL2 of the inspection control signal TSIG. After that, the control section 111 changes the output control signal OEB from a high level to a low level to release the stoppage of the drive circuit 50 and generate a pulse of the latch signal LAT. The pulse of the latch signal LAT ends the cycle Ta and starts the next cycle Ta. In the next cycle Ta, after the control section 111 changes the output control signal OEB from a low level to a high level to stop the drive circuit 50, the inspection circuit 80 transmits the determination result signal RS, which is the data of the detection result of residual vibration, to the control section 111 in the period Tx. Then, after the period Tx ends, the control section 111 changes the output control signal OEB from a high level to a low level to release the stoppage of the drive circuit 50.

In any of FIGS. 16 and 17, the drive circuit 50 is stopped in the period TS2 from the rise of the first pulse PL1 to the rise of the second pulse PL2, and thus a concern that the detection accuracy of residual vibration by the inspection circuit 80 is lowered is reduced. In addition, switching of the selection operation does not occur in each of the selection circuits 230 in the period TS2, and thus the concern that the detection accuracy of residual vibration by the inspection circuit 80 is lowered is reduced. Furthermore, since the drive circuit 50 is stopped in the period Tx, the concern that the determination result signal RS becomes erroneous data is reduced. Furthermore, in the case of FIG. 16, compared to FIG. 17, the number of times that the control section 111 changes the output control signal OEB from a low level to a high level and from a high level to a low level is reduced, and thus the control of the drive circuit 50 by the control section 111 is simplified.

Other configurations and functions of the liquid discharge apparatus 1 according to the second embodiment are the same as those of the liquid discharge apparatus 1 according to the first embodiment, and thus illustration and description thereof will be omitted.

As described above, in the liquid discharge apparatus 1 according to the second embodiment, the control section 111 stops the driving signal generation section 110 when causing the residual vibration detection section 120 to detect residual vibration. For example, after stopping the driving signal generation section 110, the control section 111 causes the residual vibration detection section 120 to start detecting the residual vibration, and causes the residual vibration detection section 120 to end the detection of residual vibration, and then the stoppage of the driving signal generation section 110 is released. Therefore, according to the liquid discharge apparatus 1 according to the second embodiment, the driving signal generation section 110 is stopped in the period in which the residual vibration detection section 120 detects the residual vibration. Therefore, the concern that the detection accuracy of residual vibration by the residual vibration detection section 120 is lowered due to the switching noise generated by the driving signal generation section 110 is reduced.

Further, in the liquid discharge apparatus 1 according to the second embodiment, the control section 111 permits switching of the selection operation of the selection circuit 230 that corresponds to the non-inspection target discharge section 600 only in the period in which the residual vibration detection section 120 is not caused to detect the residual vibration. Therefore, according to the liquid discharge apparatus 1 according to the second embodiment, the selection operation of each of the selection circuits 230 is not switched in the period in which the residual vibration detection section 120 detects the residual vibration. Therefore, the concern that the detection accuracy of residual vibration by the residual vibration detection section 120 is lowered due to the noise generated by each of the selection circuits 230 is reduced.

Furthermore, in the liquid discharge apparatus 1 according to the second embodiment, when the residual vibration detection section 120 transmits the determination result signal RS, which is the data of the detection result of the residual vibration, the control section 111 stops the driving signal generation section 110. Therefore, according to the liquid discharge apparatus 1 according to the second embodiment, the driving signal generation section 110 is stopped in the period in which the residual vibration detection section 120 transmits the data of the detection result of the residual vibration. Therefore, the concern that the data of the detection result of residual vibration becomes erroneous data due to the switching noise generated by the driving signal generation section 110 is reduced.

For example, after stopping the driving signal generation section 110, the control section 111 may cause the residual vibration detection section 120 to start detecting the residual vibration, and may cause the residual vibration detection section 120 to end the detection of residual vibration. After this, the residual vibration detection section 120 may transmit the determination result signal RS which is the data of the detection result of residual vibration, and then, the stoppage of the driving signal generation section 110 may be released. In this manner, the number of times the driving signal generation section 110 is stopped and stoppage is released, and thus the control of the driving signal generation section 110 by the control section 111 is simplified.

3. Modification Example

Although the inspection circuit 80 is provided in the head unit 20 in each of the above embodiments, at least part of the inspection circuit 80 may be provided in the control substrate 100.

In each of the above-described embodiments, the determination section 83 of the inspection circuit 80 determines the discharge state of the inspection target discharge section 600, but the control section 111 may have at least a part of the function of the determination section 83. For example, the inspection circuit 80 may transmit the time Tp or the amplitude determination value Ap illustrated in FIGS. 13 and 14 to the control section 111 as the data of detection result of residual vibration, and may determine the discharge state of the inspection target discharge section 600 based on the time Tp or the amplitude determination value Ap. Alternatively, the inspection circuit 80 may output the residual vibration signal NVT to the control section 111, and the control section 111 may determine the discharge state of the inspection target discharge section 600 based on the residual vibration signal NVT.

Further, in each of the above embodiments, the four inspection circuits 80-1 to 80-4 detect the residual vibration in the same period, but the residual vibration may be detected in different periods.

Further, in each of the above embodiments, the control section 111 stops and releases the stoppage of the eight drive circuits 50*a*-1 to 50*a*-4 and 50*b*-1 to 50*b*-4 at the same timing by the output control signals OEB1 to OEB4, but may perform stoppage and release at different timings. For example, when the detection of residual vibration by the inspection circuit 80-1 is unlikely to be affected by the noise caused by the operation of the drive circuits 50*a*-2, 50*a*-3, 50*a*-4, 50*b*-2, 50*b*-3, and 50*b*-4, the control section 111 may stop the drive circuits 50*a*-1 and 50*b*-1 by the output control signal OEB1 when causing the inspection circuit 80-1 to detect the residual vibration, and may stop the drive circuits 50*a*-2, 50*a*-3, 50*a*-4, 50*b*-2, 50*b*-3, and 50*b*-4 by the output control signals OEB2, OEB3, and OEB4.

In each of the above embodiments, the liquid discharge apparatus 1 includes eight drive circuits 50 and four inspection circuits 80, but the number of drive circuits 50 and inspection circuits 80 is not limited to these.

In each of the above embodiments, it is described that ink is not discharged even when the inspection target discharge section 600 is driven by the driving signal COMB, but the ink may be discharged from the discharge section 600 by increasing the amplitude of the driving signal COMB. Since the amplitude of the residual vibration increases as the amplitude of the driving signal COMB increases, the determination accuracy improves. In this case, for example, residual vibration detection processing is performed in an inspection mode in which printing processing is not performed.

Further, in each of the above embodiments, the control substrate 100 and the head unit 20 are coupled with one cable 190, but may be coupled with a plurality of cables. In addition, various signals may be wirelessly transmitted from the control substrate 100 to the head unit 20. That is, the control substrate 100 and the head unit 20 may not have to be coupled by the cable 190.

Further, in each of the above embodiments, the drive circuit 50 is provided in the control substrate 100, but may be provided in the head unit 20.

In addition, in the above embodiments, a part or the entirety of the waveform of the driving signal COMA is selected to generate the driving signal VOUT that corresponds to "large dot", "medium dot", "small dot", and "non-recording", and a part of the driving signal COMB is selected to generate the driving signal VOUT that corresponds to "inspection". However, the method of generating the driving signal VOUT applied to each of the piezoelectric elements 60 is not limited thereto, and various methods can be applied. For example, driving waveforms of a plurality of driving signals may be combined to generate the driving signals VOUT that corresponds to "large dot", "medium dot", "small dot", "non-recording", and "inspection". Further, for example, depending on whether or not each of the plurality of driving waveforms included in one driving signal is selected, the driving signal VOUT corresponding to "large dot", "medium dot", "small dot", "non-recording", and "inspection" may be generated.

In addition, in the above embodiment, a serial scan type ink jet printer which performs printing on a printing medium by moving a head has been described as an example of the liquid discharge apparatus. However, the present disclosure can also be employed in a line head type ink jet printer in which printing is performed on a printing medium without moving the head.

Above, the present embodiments or the modification examples have been described above, but the present disclosure is not limited to the present embodiments or modification examples, and can be implemented in various modes without departing from the gist thereof. For example, the above-described embodiment and each of the modification examples can also be appropriately combined with each other.

The present disclosure includes substantially the same configuration as the configuration described in the embodiment (for example, a configuration having the same function, method, and result, or a configuration having the same object and effect). Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiment and modification example.

According to an aspect, there is provided a liquid discharge apparatus including: a first discharge section that has a first piezoelectric element and discharges liquid by driving the first piezoelectric element with a driving signal; a driving signal generation section that generates the driving signal; a first selection section that performs a selection operation of selecting whether or not to apply each voltage of a plurality of driving waveforms included in the driving signal to the first piezoelectric element, based on a print data signal; a residual vibration detection section that detects residual vibration of the first discharge section after a voltage of a first driving waveform among the plurality of driving waveforms is applied to the first piezoelectric element; and a control section that generates the print data signal, in which the control section stops the driving signal generation section when causing the residual vibration detection section to detect the residual vibration.

According to the liquid discharge apparatus, the driving signal generation section is stopped in the period in which the residual vibration detection section detects the residual vibration. Therefore, the concern that the detection accuracy of residual vibration by the residual vibration detection section is lowered due to the noise generated by the driving signal generation section is reduced.

In the liquid discharge apparatus according to the aspect, the control section may cause the residual vibration detection section to start detecting the residual vibration after stopping the driving signal generation section.

According to the liquid discharge apparatus, the driving signal generation section is stopped before the residual vibration detection section starts detecting the residual vibration. Therefore, the concern that the detection accuracy of residual vibration by the residual vibration detection section is lowered due to the noise generated by the driving signal generation section is reduced.

In the liquid discharge apparatus according to the aspect, the control section may release the stoppage of the driving signal generation section after causing the residual vibration detection section to end the detection of the residual vibration.

According to this liquid discharge apparatus, the residual vibration detection section ends the detection of residual vibration before the driving signal generation section starts operating. Therefore, the concern that the detection accuracy of residual vibration by the residual vibration detection section is lowered due to the noise generated by the driving signal generation section is reduced.

In the liquid discharge apparatus according to the liquid discharge apparatus, the residual vibration detection section may transmit data of a detection result of the residual vibration to the control section, and the control section may stop the driving signal generation section when the residual vibration detection section transmits the data.

According to the liquid discharge apparatus, the driving signal generation section is stopped in the period in which the residual vibration detection section transmits the data of the detection result of residual vibration. Therefore, the concern that the data of the detection result of residual vibration becomes erroneous data due to the noise generated by the driving signal generation section is reduced.

In the liquid discharge apparatus according to the aspect, the control section may cause the residual vibration detection section to start detecting the residual vibration after stopping the driving signal generation section, and the control section may release the stoppage of the driving signal generation section after causing the residual vibration detection section to end the detection of the residual vibration and after the residual vibration detection section transmits the data.

According to the liquid discharge apparatus, the number of times the driving signal generation section is stopped and stoppage is released, and thus the control of the driving signal generation section by the control section is simplified.

In the liquid discharge apparatus according to the aspect, a second discharge section that has a second piezoelectric element and discharges liquid by driving the second piezoelectric element with the driving signal; and a second selection section that performs a selection operation of selecting whether or not to apply each voltage of the plurality of driving waveforms to the second piezoelectric element, based on the print data signal, may further be provided, and the control section may permit the residual vibration detection section to switch the selection operation of the second selection section only during a period in which the residual vibration detection section is not caused to detect the residual vibration.

According to this liquid discharge apparatus, the selection operation of the second selection section is not switched in the period in which the residual vibration detection section detects the residual vibration. Therefore, the concern that the detection accuracy of residual vibration by the residual vibration detection section is lowered due to the noise generated by the second selection section is reduced.

What is claimed is:

1. A liquid discharge apparatus comprising:

a first discharge section that has a first piezoelectric element and discharges liquid by driving the first piezoelectric element with a driving signal;

a driving signal generation section that generates the driving signal;

a first selection section that performs a selection operation of selecting whether or not to apply each voltage of a plurality of driving waveforms included in the driving signal to the first piezoelectric element, based on a print data signal;

a residual vibration detection section that detects residual vibration of the first discharge section after a voltage of a first driving waveform among the plurality of driving waveforms is applied to the first piezoelectric element; and a control section that generates the print data signal, wherein the control section stops the driving signal generation section when causing the residual vibration detection section to detect the residual vibration, the control section causes the residual vibration detection section to start detecting the residual vibration after stopping the driving signal generation section, and the control section releases the stoppage of the driving signal generation section after causing the residual vibration detection section to end the detection of the residual vibration.

2. The liquid discharge apparatus according to claim 1, wherein the residual vibration detection section transmits data of a detection result of the residual vibration to the control section, and the control section stops the driving signal generation section when the residual vibration detection section transmits the data.

3. The liquid discharge apparatus according to claim 2, wherein the control section causes the residual vibration detection section to start detecting the residual vibration after stopping the driving signal generation section, and the control section releases the stoppage of the driving signal generation section after causing the residual vibration detection section to end the detection of the residual vibration and after the residual vibration detection section transmits the data.

4. The liquid discharge apparatus according to claim 1, further comprising:

a second discharge section that has a second piezoelectric element and discharges liquid by driving the second piezoelectric element with the driving signal; and a second selection section that performs a selection operation of selecting whether or not to apply each voltage of the plurality of driving waveforms to the second piezoelectric element, based on the print data signal, wherein the control section permits the residual vibration detection section to switch the selection operation of the second selection section only during a period in which the residual vibration detection section is not caused to detect the residual vibration.

5. A liquid discharge apparatus comprising:

a first discharge section that has a first piezoelectric element and discharges liquid by driving the first piezoelectric element with a driving signal;

a driving signal generation section that generates the driving signal;

a first selection section that performs a selection operation of selecting whether or not to apply each voltage of a plurality of driving waveforms included in the driving signal to the first piezoelectric element, based on a print data signal;

a residual vibration detection section that detects residual vibration of the first discharge section after a voltage of a first driving waveform among the plurality of driving waveforms is applied to the first piezoelectric element; and a control section that generates the print data signal, wherein the residual vibration detection section transmits data of a detection result of the residual vibration to the control section, and the control section stops the driving signal generation section when causing the residual vibration detection section to detect the residual vibration, and the control section stops the driving signal generation section when the residual vibration detection section transmits the data.

6. The liquid discharge apparatus according to claim 5, wherein the control section causes the residual vibration detection section to start detecting the residual vibration after stopping the driving signal generation section.

7. The liquid discharge apparatus according to claim 6, wherein the control section releases the stoppage of the driving signal generation section after causing the residual vibration detection section to end the detection of the residual vibration.

8. The liquid discharge apparatus according to claim 5, wherein the control section causes the residual vibration detection section to start detecting the residual vibration after stopping the driving signal generation section, and the control section releases the stoppage of the driving signal generation section after causing the residual vibration detection section to end the detection of the residual vibration and after the residual vibration detection section transmits the data.

9. The liquid discharge apparatus according to claim 5, further comprising:

a second discharge section that has a second piezoelectric element and discharges liquid by driving the second piezoelectric element with the driving signal; and a second selection section that performs a selection operation of selecting whether or not to apply each voltage of the plurality of driving waveforms to the second piezoelectric element, based on the print data signal, wherein the control section permits the residual vibration detection section to switch the selection operation of the second selection section only during a period in which the residual vibration detection section is not caused to detect the residual vibration.

* * * * *